(12) United States Patent
Mu

(10) Patent No.: US 7,809,868 B1
(45) Date of Patent: Oct. 5, 2010

(54) SYSTEM AND METHOD FOR FILTERING INFORMATION IN A DATA STORAGE SYSTEM

(75) Inventor: Paul Yuedong Mu, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 242 days.

(21) Appl. No.: 11/789,073

(22) Filed: Apr. 23, 2007

(51) Int. Cl.
*G06F 13/12* (2006.01)

(52) U.S. Cl. .............................. 710/74; 710/5; 710/62; 709/230

(58) Field of Classification Search .................. None
See application file for complete search history.

(56) References Cited

U.S. PATENT DOCUMENTS

| | | | |
|---|---|---|---|
| 5,546,211 A * | 8/1996 | Devon | 398/98 |
| 5,568,629 A | 10/1996 | Gentry et al. | |
| 5,889,934 A | 3/1999 | Peterson | |
| 6,286,030 B1 * | 9/2001 | Wenig et al. | 709/203 |
| 7,127,577 B2 | 10/2006 | Koning et al. | |
| 7,237,021 B2 | 6/2007 | Penny et al. | |
| 2005/0210278 A1 * | 9/2005 | Conklin et al. | 713/194 |
| 2006/0101476 A1 * | 5/2006 | Robert | 719/328 |
| 2007/0083657 A1 * | 4/2007 | Blumenau et al. | 709/226 |

OTHER PUBLICATIONS

Rajeev Nagar, "Filter Manager," Microsoft Corporation, 2003.
Fuse File System, fuse.sourceforge.net.

* cited by examiner

*Primary Examiner*—Eron J Sorrell
(74) *Attorney, Agent, or Firm*—Blakely, Sokoloff, Taylor & Zafman LLP

(57) ABSTRACT

A storage system filter provides protocol aware filter operations that avoid I/O blocking or calling thread holding. A filter framework includes a filter controller that handles request and response calls to filters that are registered with the filter framework. Filters may be loaded and unloaded in a consistent state, and the filter framework provides services for the filters for common functions. Filters may operate in a user mode or a kernel mode and may be invoked in a synchronous, an asynchronous, or an asynchronous release mode. Filter registration may include registration for I/O resources, and may include tagging of I/O requests and responses to contribute to preventing conflicts.

38 Claims, 11 Drawing Sheets

SYSTEM AND METHOD FOR FILTERING INFORMATION IN A DATA STORAGE SYSTEM

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

Embodiments of the present invention relate to data storage and retrieval system, and in particular, to systems and methods for filtering information in the data storage and retrieval system.

2. Description of Related Art

A data storage and retrieval system typically includes one or more specialized computers (variously referred to as file servers, storage servers, storage appliances or the like, and collectively hereinafter referred to as "filers"). Each filer has a storage operating system for coordinating activities between filer components and external connections. Each filer also includes one or more storage devices, which can be connected with other filers, such as via a storage network or fabric. Exemplary storage devices include individual disk drives, groups of such disks and redundant arrays of independent (or inexpensive) disks (RAID groups). The filer is also connected via a computer network to one or more clients, such as computer workstations, application servers or other computers. Software in the filers and other software in the clients cooperate to make the storage devices, or groups thereof, appear to users of the workstations and to application programs being executed by the application servers, etc., as though the storage devices were locally connected to the clients.

Centralized data storage (such as network storage) enables data stored on the storage devices to be shared by many clients scattered remotely throughout an organization. Network storage also enables information systems (IS) departments to store data on highly reliable and sometimes redundant equipment, so the data remain available, especially in the event of a catastrophic failure of one or more of the storage devices. Network storage also facilitates making frequent backup copies of the data and providing access to backed-up data, when necessary. Backup applications are available to achieve high data integrity without having a significant impact on performance, such as may be obtained with incremental backup applications, in which only changed data is recorded in a backup operation.

Filers can also perform other services that are not visible to the clients. For example, a filer can treat all the storage space in a group of storage devices as an "aggregate." The filer can then treat a subset of the storage space in the aggregate as a "volume."

Filers include software that enables clients to treat each volume as though it were a single storage device. The clients issue input/output (I/O) commands to read data from or write data to the volume. The filer accepts these I/O commands; ascertains which storage device(s) are involved; issues I/O commands to the appropriate storage device(s) of the volume to fetch or store the data; and returns status information or data to the clients.

Typically, the filer manages storage space on the storage devices on a per-volume basis. Disk blocks, which represent contiguous physical units of storage, are composed of a number of bytes and are used as the fundamental storage constructs to store files. A file may be represented as a number of blocks of storage, depending upon the size of the file. The filer keeps track of information related to the volume, files and blocks. For example, the filer tracks the size of the volume, the volume owner, access protection for the volume, a volume ID and disk numbers on which the volume resides. The filer also keeps track of directories, directory and file owners and access protections.

Additional information about files maintained by the filer may include file names, file directories, file owners and protections, such as access rights by various categories of users. The filer may also track file data for reference purposes, which file data may include file handles, which are internal file identifiers, and read offsets and read amounts, which determine location and size of a file. The filer also tracks information about blocks that store data and make up files. For example, the filer may track blocks that are allocated to files, blocks that are unallocated, or free to be used, as well as information about the blocks. In addition, the filer may track internal block data such as block checksums, a block physical location, a block physical logical offset, as well as various special purpose blocks.

An example of a special purpose block is a superblock, which contributes to mounting a volume, where the superblock includes all the information needed to mount the volume in a consistent state. The superblock contains a root data structure commonly known as an index node ("inode"), from which a tree of inodes are located and used to locate other blocks in the volume. The superblock contains information about the volume, such as volume configuration or a volume ID. The volume information may be read into a cache when a given associated volume is mounted.

The above-described information tracked by the filer collectively constitutes a "file system," as is well known in the art. For example, the filer can implement the Write Anywhere File Layout (WAFL®) file system, which is available from Network Appliance, Inc. of Sunnyvale, Calif. Alternatively, other file systems can be used.

According to the exemplary WAFL file system, storage space on a volume is divided into a plurality of 4 kilobyte (KB) blocks. Each block has a volume block number (VBN), which is used as an address of the block. Collectively, the VBNs of a volume can be thought of as defining an address space of blocks on the volume.

Stored in each block is a checksum value that helps to verify data integrity. The checksum is a number resulting from a calculation performed on the contents of the block, typically involving all the block storage bytes. If a calculated checksum does not match the stored checksum in the block, the block data is likely corrupted and appropriate measures may be taken to recover. The checksum information for each block is a system internal value that is dynamic and not typically available for inspection.

Each file on the volume is represented by a corresponding inode. Files are cataloged in a hierarchical set of directories, beginning at a root directory. Each directory is implemented as a special file stored on the same volume as the file(s) listed in the directory. Directories list files by name (typically alphabetically), to facilitate locating a desired file. A directory entry for a file contains the name of the file, the file ID of the inode for the file, access permissions, etc. The collection of directory names and file names is typically referred to as a name space. Various name spaces may be created that have specific purposes, where each name space has a root directory called a "metaroot."

The inodes, directories and information about which blocks of the volume are allocated, free, etc., as well as block checksum information, collectively form system information metadata. An allocated block is a data block that stores data, while a free block is one that is unallocated and available to be assigned to store specific data. The metadata may be public or private, that is, being typically made available to users or not. Some metadata is stored in specially named files stored on the volume and, in some cases, in specific locations on the volume, such as in a "volume information block," as is well known in the art. When one or more blocks are to be retrieved from disk, the operating system may retrieve the blocks to a system cache, to satisfy an I/O request made by a client. The operating system executes a routine to communicate with appropriate device drivers to cause the desired blocks to be read from the storage device(s) into the cache. In one implementation of a volume, each pointer contains both a physical and a virtual address of the 4 KB block. The physical address is referred to as a "physical volume block number" (PVBN), which identifies the physical address of the pointed-to block, relative to the beginning of the volume. The virtual address is referred to as a "virtual volume block number" (VVBN), which identifies the block number relative to the beginning of the container file.

Some storage operating systems implemented in filers include a capability to take "snapshots" of an active file system. A snapshot is a persistent point in time image of the active file system that enables quick recovery of data after data has been corrupted, lost, or altered. Snapshots can be created by copying the data at each predetermined point in time to form a consistent image. Snapshots can also be created virtually by using a pointer to form the image of the data. A snapshot can also be used as a storage space-conservative mechanism, generally composed of read-only data structures that enables a client or system administrator to obtain a copy of all or a portion of the file system, as of a particular time in the past, i.e. when the snapshot was taken.

As part of ordinary operation of the network storage system, the operating system employs file system filters to realize certain features. Filters may perform tasks related to filer operations, including the storage and retrieval of information. Filter operations may include permitting or preventing access to files or file metadata, for example. Filter tasks may include capturing backup information for preserving data or data transfer or conversion, as may be the case during migrations or upgrades. Examples of file system filters include antivirus products that examine I/O operations for virus signatures or activity, user access permissions, encryption products and backup agents.

File system filters are typically organized as kernel-mode applications that are dedicated to a specific purpose. The file system filter is typically arranged in the I/O data path, to permit the filter to intercept I/O requests and responses. This configuration for a file system filter exhibits several drawbacks, including impacting control flow for I/O operations, little or no control of filter sequence or load order and systematic issues with filters being attached to the operating system kernel. There is also typically no convention with respect to filter construction, so that the filters arranged in a sequence may conduct operations that cause conflicts or errors in the operating system, potentially leading to crashes. Filters may also be constructed to generate their own I/O requests, and may be reentrant, leading to stack overflow issues and significant performance degradation. There may be redundancy among groups of filters for common operations, such as obtaining file/path names, generating I/O requests or attaching to mounted volumes and redirectors, as well as buffer management. Some of these common tasks are performed inconsistently among the various filters, leading to inefficiency and performance degradation.

File system filter architectures have been proposed to overcome some of the above-described drawbacks. According to one configuration, a filter manager is provided between an I/O manager and data storage devices. The filter manager provides services for execution of filter functions while overcoming some of the above-described drawbacks. For example, the filter manager can provide a filter callback architecture that permits calls and responses rather than chained dispatch routines. A call to a filter invokes the filter, often with passed parameters, while a callback represents instructions passed to the filter for execution, often to call other procedures or functions. For example, a callback to a filter may be in the form of a pointer to a function or procedure passed to the filter. The filter manager can also provide uniform operations for common tasks such as generating I/O requests, obtaining file/path names, managing buffers and attaching to mounted volumes and redirectors. In addition, the filter manager can maintain a registry of filters and their specific functionality requirements, such as specific I/O operations. By maintaining a registry of filters, the filter manager can load and unload filters with consistent results and states. In addition, the filters can be enumerated for various filter management functions.

There are several challenges that are not addressed by the above-described filter manager in a file system connected through a network. For example, the above-described filter manager is specific to a local filer, where all requests and responses represent local file access activity. Accordingly, the above-described filter manager is unable to take advantage of available information contained in the request that might indicate request source or aid in request processing. In addition, the above described filter manager is file based, and thus unable to provide filtering services for other types of access methods. For example, one type of advantageous data access protocol operates on a block basis, rather than a file basis. Data access protocols such as iSCSI and Fiber Channel permit direct access to data blocks in a file system, and are unrecognized by the above-described local filer and filter manager. The filter manager is also unable to identify external sources or addresses for requests and responses that might aid in request processing, such as are available in the IP protocol, for example. The filter manager is unable to pass high level protocol information to filters through the filter architecture to obtain the advantages that might be possible with the additional information available for processing requests and responses by the filters. Accordingly, the filter manager does not have context information for the request or response to be processed. Context information refers to information known to a particular object, such as a filter, that the object can use or produce as a result of object processing. For example, CIFS and NFS file protocol based requests include a client source address, which can provide a context for a filter processing the request or response. The above described filter manager does not provide such a context, for example.

In addition, the filter manager is a kernel-mode application, and is synchronous to the extent that the filter manager has limitations related to processing threads that must complete before being released. Moreover, the filter manager does not act to preserve data or I/O operations in the event of a load or unload command.

A number of activities undertaken by a file system would potentially benefit from being configured as filter activities, rather than application-specific tasks. For example, hidden or dynamic information such as some metadata in the active file system may be somewhat difficult to access and provide in response to a client request. Some static processes such as a system snapshot might reveal the condition of various metadata, but may not provide hidden or dynamic metadata. The snapshot is also typically further processed, for example by tracing through file inodes to obtain the desired results based on the exposed metadata. An Application Programming Interface (API) may be used to expose hidden metadata, but such application-specific approaches can be complex and somewhat inefficient with respect to obtaining desired data.

In addition, applications may access file system data to perform calculations for achieving file system tasks. One such example is a backup application, which typically operates by reading backup related data, such as incremental changes to a file system, to determine which file system blocks should be read or copied for a back up. Again, the application may be somewhat complicated, or use system resources in such a way to decrease system efficiency. For example, a backup application may provide a particular amount point that obtains modified file information. Other backup applications may search for a last modified time or an archive tag toggle for determining changes to files. A customized "dirty" region log or a comparison of successive snapshots may be used to prepare the incremental backup information needed to perform read operations to save the desired blocks that have been changed.

SUMMARY OF THE INVENTION

A system and method for filtering information in a data storage system provide filter operations that avoid input/output (I/O) blocking or holding a calling thread. The filter operations are conducted through a filter framework that includes a filter controller that handles request and response calls to filters that are registered with the filter framework. The filter controller passes protocol information to the filters to permit filter operations that are responsive to the protocol information. Protocol information refers to a systematic format for a request or a response in the data storage system, some of which formats include information related to block accesses or source/destination of requests or responses that are external to the data storage system. Filters may be loaded and unloaded in a consistent state, meaning that outstanding requests or responses processed by a filter are suspended to permit the filter to be loaded or unloaded without changing state in relation to processing requests or responses. The filter framework provides services for the filters for common functions. Filters may operate in a user mode or a kernel mode, and may be invoked in a synchronous, an asynchronous, or an asynchronous release mode. Filter registration may include registration for I/O resources, and may include tagging of I/O requests and responses to contribute to preventing conflicts. The filter can be implemented in a file system as described above or in a general data storage system. For example, the filter can be implemented in a device driver for controlling I/O for a storage device. Alternately, or in addition, the filter can be implemented in a disk controller that causes the disk to access the physical locations used to store data.

The filter framework may be implemented as a single binary that is "hooked into" or coupled to the filer in one or more of a variety of locations. A single binary executable application is a standalone instruction code that can be compiled as a separate module, for example. The locations for hooking the filter framework include points in a data flow, such as at a client interface, a protocol interface, a network interface or a messaging interface for communicating with storage devices. The filter framework provides a queue for each point at which the filter framework is coupled to the filer. The queues are maintained on a volume basis. The queues maintain filter call identifiers to enable filters to intercept data in the data path for the point at which the filter framework is coupled to the filer. A filter controller is provided to capture request and responses for file system data and invoke applicable filters. The filter controller may invoke filters according to several different invocation models, including synchronous, asynchronous and asynchronous release configurations. The use of a synchronous model causes the filters associated with the filter controller to hold incoming I/O and block the calling thread until execution completes. An asynchronous configuration causes the filter to hold incoming I/O until execution completes, but releases the calling thread. The asynchronous release configuration causes the filter to execute without blocking incoming I/O or the calling thread.

The filters associated with the filter framework may be loaded or unloaded in the filter framework. The filters are arranged in a particular order for callback operations, based on, for example, priority. A callback represents instructions passed to a given filter for execution, often to call other procedures or functions. For example, a callback to the filter may be in the form of a pointer to a function or procedure passed to the filter. The filter can produce I/O operations, with each filter I/O being provided with a tag for identification. The filter I/O tagging permits the filter framework to identify the originating filter of the filter I/O. One advantage to providing filter I/O tagging is to avoid conflicts that may occur with multiple I/O requests from a single filter source. In addition, filter I/O tagging contributes to permitting the filter framework to determine if the filter I/O has a particular priority, based on the filter priority. Filters with higher priority can potentially receive a greater time slice of available processing time. Accordingly, by tagging the filter I/O, the filter framework can allocate processing time to I/O requests more appropriately.

In an exemplary embodiment of the present invention, the filter framework includes an I/O map and an event map that contribute to determining when and how a registered filter should be called. The I/O map is a data structure that holds identifiers for filters and I/O operations for which the filters are registered. The identifiers are used to provide the registered callbacks for the registered filters, while the event map provides information concerning when a particular callback is made. The event map is a data structure that holds identifiers for filters and filter characteristics, such as an indication of whether a filter is a remote filter. A filter call results from an evaluation of an expression that involves information taken from the I/O map and the event map. The determination of when and how to call a filter can be advantageous when filter calls generate significant amounts of control traffic in the filter framework or filer.

The filter controller invokes the filters through a request callback mechanism on an incoming path, and through a response callback mechanism on a return path. The request and response callbacks are registered with the filter controller to permit an organized callback mechanism and progression. A request or response that causes a filter to be invoked involves the use of a particular data structure for each I/O operation. The data structure may include system call parameters or dedicated protocol components for internal file system operations. The filters may be operable in a kernel space or a user space, with associated support being provided in the filter framework for kernel mode or user mode filter applications. Kernel mode filters can take advantage of the filter framework being coupled to the filer at various points to interact with filer components at the various points. The points at which the filter framework is coupled to the filer that permit kernel mode filter interaction include locations within or before a protocol server, between the protocol server and a messaging interface for communicating with data storage devices or located between the messaging interface and the data storage devices. The kernel mode filters can thus be single source based, and compiled once, but placed into the filer at different points of interaction. User mode filter applications can be of two types, local user mode filters and remote user mode filters. The filters typically are associated with a particular volume or snapshots for a particular volume.

According to an aspect of the present invention, a resource manager is made available for handling a variety of filter functions. The resource manager provides resources at both a user level and a kernel level.

According to an exemplary embodiment of the present invention, a filter controller is interposed in a messaging path between a storage control module and a storage device. The filter controller intercepts messages or requests from the storage control module and invokes the filters through a request callback. The filter controller includes a request handler that begins processing the request in accordance with the nature of the request and the configuration of the filter, such as user or kernel mode. The intercepted request is forwarded to the storage device, depending upon the status provided by the filter configuration. For example, the filter may provide a status to the filter controller and the filter framework that indicates the request should be permitted to be sent to the storage device. The storage device returns a response prompted by the request that is also intercepted by the filter controller. The filter controller then invokes the appropriate filters with a response callback. The filters include response handlers to process the response. Both the request handlers and the response handlers in the filters may provide a status to the filter controller and the filter framework to permit a return from the request or response callback, to permit other filters to be called or to generally return status information to the filter controller.

According to another exemplary embodiment, the filter framework is interposed between a protocol interface front end and a protocol interface back end to permit protocol conversions to occur before filters related to requests and responses are invoked. According to another exemplary embodiment, the filter framework is interposed between a client and a protocol interface so that client requests and responses cause filter invocations within the protocol being used by the client. The filter framework can perform protocol conversion and pass the requests and responses between the client and the protocol interface.

The filter framework provides a number of features, including filter loading and unloading. A filter loader registers a filter with the filter controller and identifies resources to be used for filter operations. The filter framework can freeze I/O during loading and unloading or starting and stopping a given filter. For example, the filter framework can maintain a buffer to permit filter related I/O to be halted and stored while the filter changes state, such as from "loaded" to "started." The filter loader also provides a counter for each filter to permit tracking of I/O operations in the event of a filter unload. The filter framework tracks filter I/O and completes processing of the filter I/O prior to unloading. The counter maintained for each filter counts down to zero to indicate all I/O processing has been completed, and that the filter is ready for unloading. The filter loader also provides I/O tagging, so that filter I/O requests and responses can be identified to avoid conflicts.

In accordance with the present invention, an exemplary filter that may be used with the filter framework exposes metadata information that is normally difficult to obtain or dynamic in an active file system. The filter takes data from the active file system and prepares a separate directory structure accessed through a metaroot, which mirrors the root node of interest of the active file system. The metaroot permits access to directory structures as mirrors of the active file system, and the filter can provide various virtualization support for accessing and presenting the data mirrored from the active file system. A client may access the metaroot and directory structures to obtain hidden or dynamic metadata for a volume, file or block that is not otherwise typically available. For example, the client may use the metaroot to walk through the file system locally or remotely to retrieve hidden or dynamic file system metadata. Hidden metadata may include, for example, a block checksum, a block location (physical address) or a block access history. The file system filter can redirect a read access applied to the metaroot to the active file system to obtain information about files and file attributes. For example, the file system filter can create a file stub to match a file in the active file system. A file stub is an initial file structure that can be filled in with content to form a typical file in a file system. The filter can use the file identifier from the file stub to prepare and present information related to file metadata.

Another exemplary filter supports an incremental backup operation for a file system. The incremental backup can be transparent, meaning that backup applications can read incremental changes directly from the active file system. Alternately, or in addition, the incremental backup operation can take advantage of a change log filter that tracks all changes to the file system for use with a backup application.

The transparent incremental backup avoids a step of calculating an incremental backup set of parameters for doing an incremental backup. The file system filter intercepts writes to the file system and records which file blocks have "dirty" regions, meaning that changes have been made to those file blocks or directories that have not yet been backed up. The filter also checks with backup applications to determine which incremental backups have already been made, and supplies data for identifying which further incremental backups should be made. The backup application need not determine which incremental backups need to be made, since the filter provides that data transparently. The filter can determine if a read operation is made by a backup application. If the read is for the backup application, the dirty region log is consulted to determine if the block has been modified. If the block has not been modified, the filter provides a specific response or indication to the read request, so that the backup application understands that the block need not be read for backup purposes. The transparent incremental backup may operate in synchronous or asynchronous mode.

The change log file system filter captures requests related to data modification, including write, delete, rename, create, set attribute, set securities and set extended attributes. The filter can operate in a synchronous release mode, and may be placed in any order in a cascade or chain of filters called by a filter framework. The filter can generate requests for input and output with the file system. For example, the filter may provide an input request for checksum data, and output requests for maintaining log information. Client commands captured by the filter in relation to modification to file system data are parsed and used to format log entries that may include information such as a volume ID, a file handle including an inode or file ID, an operation (write, delete, etc.), an offset and a length. Entries are added to a change log in the file system, which may be in the form of a B-tree. A B-tree is a tree data structure that maintains the data in a sorted format while permitting insertions and deletions. Other formats for the change log are equally applicable, including a simple sequential log.

BRIEF DESCRIPTION OF THE SEVERAL VIEWS OF THE DRAWINGS

The present invention is described in greater detail below, with reference to the accompanying drawings, in which.

DETAILED DESCRIPTION OF THE INVENTION

The concepts of the file system filter in accordance with the present disclosure derive support from a file system architecture with sophisticated mechanisms for storing, maintaining and retrieving data. A discussion of the filing system, or filer, in which an embodiment of the file system filter architecture is implemented follows below.

Figure 1:
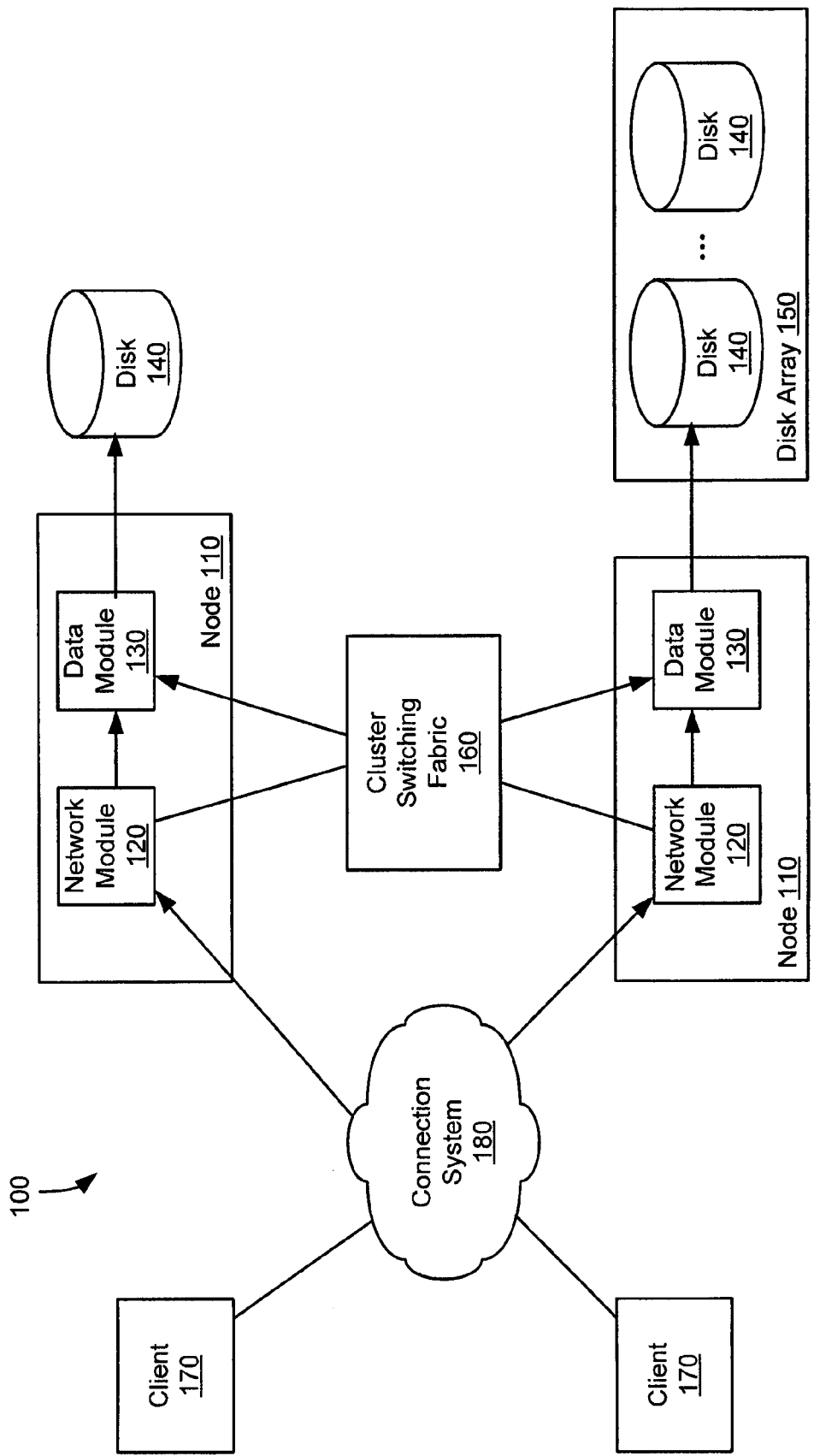
FIG. 1 is a diagram illustrating a cluster having a plurality of nodes.

FIG. 1 is a diagram illustrating a storage system cluster with a storage system architecture 100 having a plurality of nodes 110. Each node 110 is generally organized with a network module 120 and a disk module 130. Network module 120 includes functionality that enables node 110 to connect to clients 170 over a connection system 180, while disk modules 130 connect to one or more storage devices, such as disks 140 or a disk array 150. Nodes 110 are interconnected by a switching fabric 160 which may be embodied as a Gigabit Ethernet switch, for example. It should be noted that while there is shown an equal number of network and disk modules in the illustrative architecture 100, there may be differing numbers of network and disk modules in accordance with various embodiments of the present invention. For example, there may be a plurality of network and disk modules interconnected in a configuration that does not reflect a one-to-one correspondence between the network and disk modules.

The clients 170 may be general-purpose computers configured to interact with the node 110 in accordance with a client/server model of information delivery. For example, interaction between the clients 170 and nodes 110 can enable the provision of storage services. That is, each client 170 may request the services of the node 110, and the node 110 may return the results of the services requested by the client 170, by exchanging packets over the connection system 180, which may be wire-based, optical fiber, wireless or combinations thereof. The client 170 may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client 170 may issue packets including block-based access protocols, such as the Small Computer Systems Interface (SCSI) protocol encapsulated over TCP (iSCSI) and SCSI encapsulated over Fiber Channel (FCP), when accessing information in the form of blocks.

Figure 2:
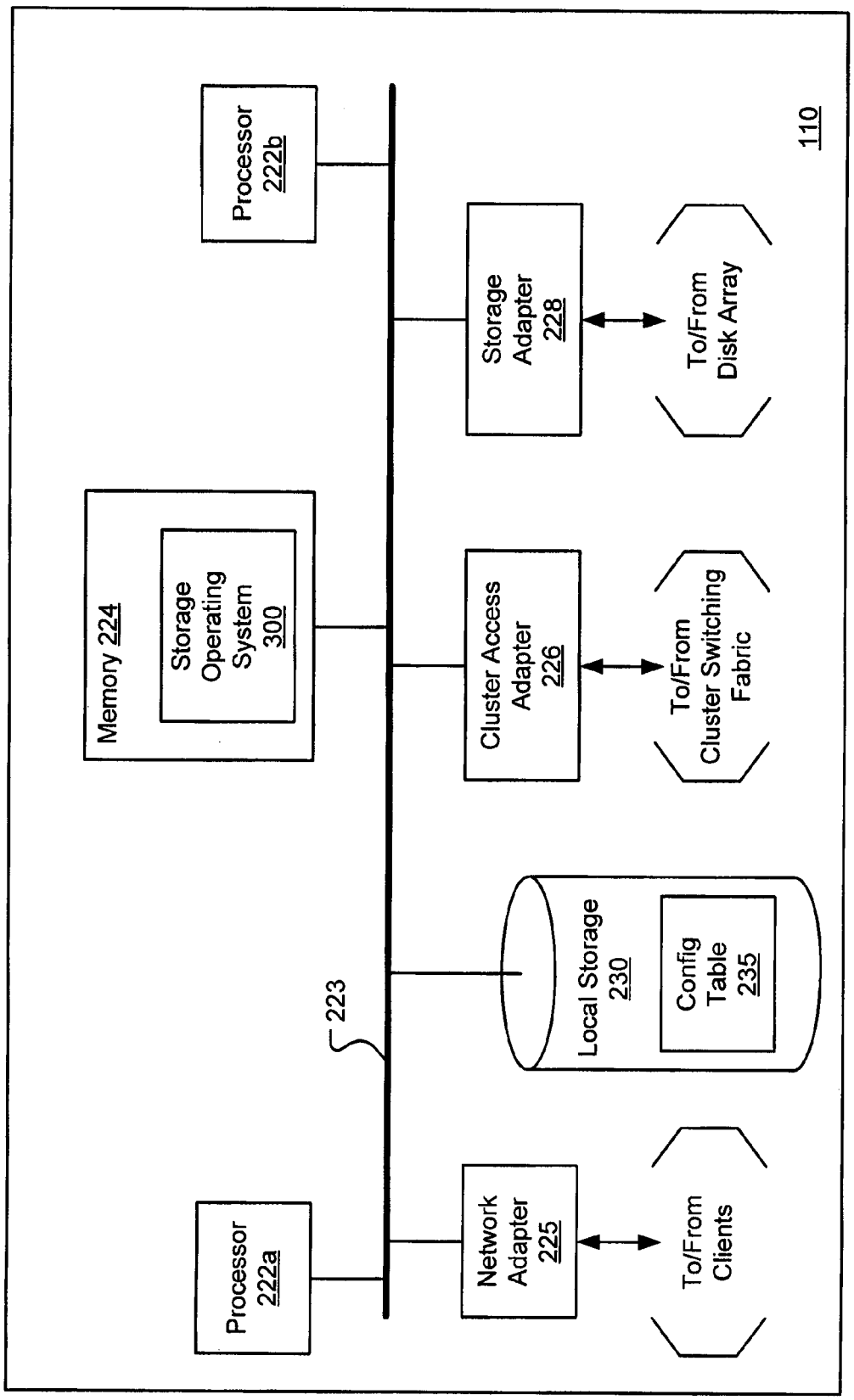
FIG. 2 is a diagram illustrating a node of the cluster.

FIG. 2 is a diagram illustrating further details of node 110 of architecture 100. Specifically, node 110 is illustratively embodied as a storage system comprising a plurality of processors 222a,b, a memory 224, a network adapter 225, a cluster access adapter 226, a storage adapter 228 and local storage 230 interconnected by a system bus 223. Local storage 230 comprises one or more storage devices, such as disks 140, that locally store configuration information in a configuration table 235, for example. Cluster access adapter 226 comprises a plurality of ports adapted to couple node 110 to other nodes 110 in architecture 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the network modules and disk modules are implemented on separate storage systems or computers, cluster access adapter 226 is utilized by the network or disk modules for communicating with other network or disk modules in architecture 100.

Each node 110 is illustratively embodied as a dual processor storage system executing a storage operating system (OS) 300. Storage OS 300 preferably implements a high-level module, such as a file system, to logically organize the information as a hierarchical structure of named directories, files and blocks on the disks. However, it will be apparent to those of ordinary skill in the art that node 110 may alternatively comprise a single or more than two processor system. Illustratively, one processor 222a can execute the functions of a network module 310 on the node, while processor 222b can execute the functions of a disk module 350. It should also be appreciated that processors 222a,b may include multiple processing cores, thus improving the processing speed of processors 222a,b.

Memory 224 illustratively comprises storage locations that are addressable by the processors and adapters for storing software program code and data structures associated with the present invention. The processor and adapters may, in turn, comprise processing modules and/or logic circuitry configured to execute the software code and manipulate the data structures. Storage OS 300, portions of which are typically resident in memory and executed by the processing modules, functionally organizes node 110 by, inter alia, invoking storage operations in support of the storage service implemented by node 110. It will be apparent to those skilled in the art that other processing and memory means, including various computer readable media, may be used for storing and executing program instructions.

Network adapter 225 comprises a plurality of ports adapted to couple node 110 to one or more clients 170 over point-to-point links, wide area networks, virtual private networks implemented over a public network (Internet) or a shared local area network. Network adapter 225 thus may comprise mechanical, electrical, optical or other connection and signaling components to connect node 110 to a network. Illustratively, connection system 180 may be embodied as an Ethernet network or a Fiber Channel (FC) network. Each client 170 may communicate with node 110 over connection system 180 by exchanging discrete frames or packets of data according to pre-defined protocols, such as TCP/IP.

Storage adapter 228 cooperates with storage OS 300 executing on node 110 to access information requested by clients 170. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on disks 140 of disk array 150. Storage adapter 228 comprises a plurality of ports having input/output (I/O) interface circuitry that couples to the disks over an I/O interconnect arrangement, such as a conventional high-performance, FC link topology.

Storage of information on each disk array 150 is preferably implemented as one or more storage volumes that comprise a collection of physical storage disks 140 cooperating to define an overall logical arrangement of volume block number (VBN) space on the volume(s). Each logical volume is generally, although not necessarily, associated with its own file system. Disks 140 within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

To facilitate access to disks 140, storage OS 300 implements a write-anywhere file system that cooperates with one or more virtualization modules to "virtualize" the storage space provided by the disks 140. A file system 360 logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

Storage OS 300 provides a processing architecture for implementing the file system, and includes a variety of components typically found in a sophisticated operating system processing. For example, the processing of OS 300 is divided into different modes, a kernel mode and a user mode. The kernel mode processing takes advantage of a kernel space, while the user mode processing takes advantage of a user space. The kernel space and user space interact to pass information for processing within the different modes, and typically the modes are maintained separately. One reason for maintaining the separate modes is security for the file system. Kernel mode operations are typically configured as internal or system oriented operations, while user mode operations are typically undertaken by applications and user accesses. Often, an application or user submits a request in user mode, which prompts a system call that is handled in kernel mode, with the response transferring information from the kernel mode operations to the user mode operations.

Processing in OS 300 typically involves interaction between a number of processes, each with their own resources, such as address space and state information. Processes typically operate in OS 300 in kernel mode, and provide system oriented operations, such as calls to hardware devices. Processes typically do not interact with each other, except through system-provided inter-processes communication mechanisms.

Processing threads are operational sequences for program execution that may execute in parallel with each other. Processes typically have one or more threads associated with their operation to carry out one or more tasks assigned to the process. In the case of a single processor with a single core or computing engine, multiple threads may be executed in parallel through multitasking architectures such as time slicing or event oriented processing. A single processor with a single core executes multiple threads by switching between the threads at specified points, so that the processing of multiple parallel threads is not literally simultaneous. In the case of multiple processors or a processor with multiple cores, multiple threads may be processed literally simultaneously, as may be the case in node 110 with processors 222a, b, as shown in FIG. 2.

Multiple threads may be formed in an application that operates in user mode. Threading implemented by application programs often relies on self-governance to permit interruption of threads or thread switching. Unlike typical process configurations, threads may typically share state information, address space or other resources directly. Context switching between threads is typically very fast in comparison to context switching between processes. Context switching refers to the saving or transfer of state information related to a given thread so that another thread can install state information to provide a context for that thread. In the case of multiple processors or cores, threads may execute concurrently, which, while advantageous, can lead to challenges in synchronization. For example, while different threads may work on different tasks simultaneously, processing or data in one thread may rely on a result from another thread. Accordingly, concurrently executing threads often are coordinated or synchronized to attain proper overall execution. A mechanism may be used to prevent a thread from continuing processing until another thread reaches a specified point, to permit correct data manipulation or to prevent attempts at simultaneous modification of common data. Such mechanisms for preventing simultaneous access to resources such as data are often referred to as locks. Accordingly, one thread may lock access to a resource until processing completes, at which point the resource may be accessed by another thread.

Threads that operate in user mode sometimes issue system calls that block the called resource. For example, a thread may request resources for performing I/O, which is often performed synchronously. Synchronous I/O operations involve system calls that typically do not return until the I/O operation has been completed. Waiting for the system call to return can block the thread or entire process that is awaiting execution by the thread. In addition, other threads in the same process are prevented from being executed. Techniques to overcome the effects of blocking system calls include the use of a synchronous interface that uses non-blocking I/O internally, or structuring a program to avoid the use of synchronous I/O or other types of blocking system calls.

Threads also typically use locks for resources including data that should not be accessed while being processed or manipulated. The lock will permit a thread to obtain access to the resource, excluding all other threads or processes. Managing locks on resources or data can be made the responsibility of the threads requesting the resource or data. In addition, or alternatively, the use of locks for resources accessed by multiple threads may be managed by a separate scheduling thread or process.

In the illustrative embodiment, processes and threads are implemented in storage OS 300, which is preferably the NetApp® Data ONTAP® operating system available from Network Appliance Inc., of Sunnyvale, Calif. Storage OS 300 thus preferably implements a Write Anywhere File Layout (WAFL®) file system. However, it is expressly contemplated that any appropriate storage operating system may be enhanced for use in accordance with the inventive principles described herein. As such, storage OS 300 should be taken broadly to refer to any storage operating system that is otherwise adaptable to the teachings of this invention.

Storage OS 300 comprises a series of software layers organized to form an integrated network protocol stack or, more generally, a multi-protocol engine 325 that provides data paths for clients 170 to access information stored on the node 110 using block and file access protocols. The multi-protocol engine 325 includes a media access layer 312 of network drivers, for example, gigabit Ethernet drivers, that interfaces to network protocol layers, such as an IP layer 314 and supporting transport mechanisms, a TCP layer 316 and a User Datagram Protocol (UDP) layer 315. A file system protocol layer provides multi-protocol file access and, to that end, includes support for a Direct Access File System (DAFS) protocol 318, an NFS protocol 320, a CIFS protocol 322 and a Hypertext Transfer Protocol (HTTP) 324. A VI layer 326 implements the VI architecture to provide direct access transport (DAT) capabilities, such as RDMA, as required by DAFS protocol 318. An iSCSI driver layer 328 provides block protocol access over the TCP/IP network protocol layers, while an FC driver layer 330 receives and transmits block access requests and responses to and from node 110. The FC and iSCSI drivers provide FC-specific and iSCSI-specific access control to the blocks and manage exports of luns to iSCSI or FCP components.

Storage OS 300 may establish a session using one of the above-described protocols to form a connection between a client and node 110. The session may rely on a session layer of one of the network protocols discussed above, for example, through Telnet or FTP. The session implementation can be maintained by a higher level program, such as storage OS 300.

In addition, storage OS 300 includes a series of software layers organized to form a storage server 365 that provides data paths for accessing information stored on the disks 140 of architecture 100. Storage server 365 includes a file system module 360 for managing volumes 310, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage OS 300 through the interaction with one or more virtualization modules illustratively embodied as, e.g., a virtual disk (vdisk) module (not shown) and a SCSI target module 335. The vdisk module enables access by administrative interfaces, such as a user interface of a management framework (not shown), in response to a user (system administrator) issuing commands to the node 110. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks 140. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system having an on-disk format representation that is block-based using, e.g., 4 kilobyte (kB) blocks and using inodes to identify files and file attributes (such as creation time, access permissions, size and block location). The file system uses files to store some metadata, such as that describing the layout of its file system; these metadata files include, among others, an inode file. A file handle, i.e., an identifier that includes an inode number, is used to retrieve an inode from disk.

Operationally, a request from the client 170 is forwarded as a packet over the connection system 180 and onto the node 110 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 140 if it is not cached, or resident "in core", i.e., in memory 224. If the information is not in memory, the file system 360 indexes into the inode file using the inode number to access an appropriate entry and retrieve a logical VBN. The file system 360 then passes a message structure including the logical VBN to the RAID system 380; the logical VBN is mapped to a disk identifier and disk block number (disk,dbn) and sent to an appropriate driver (e.g., SCSI) of the disk driver system 390. The disk driver accesses the dbn from the specified disk 140 and loads the requested data block(s) in memory for processing by the node. Upon completion of the request, the node 110 (and operating system) typically returns a response to the client 170 over the connection system 180.

As described in greater detail below, a file system filter may be implemented in accordance with the present invention in node 110 to intercept the client request and data storage response. Portions of the file system filter may be implemented at various locations within the filer architecture, such as at protocol conversion points or disk access points. The file system filter establishes software hooks in storage OS 300 for connecting the file system filter to the filer to take advantage of the above-described filer features.

It should be noted that the software "path" through the storage operating system layers described above used to perform data storage access for the client request received at node 110 may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 110 in response to a request issued by the client 170. Moreover, the processing modules of adapters 225, 228 may be configured to offload some or all of the packet processing and storage access operations, respectively, from processor 222, to thereby increase the performance of the storage service provided by the node 110. It is expressly contemplated that the various processes, architectures and procedures described herein can be implemented in hardware, firmware or software, and may use storage media that includes various types of read only, random access and disk storage.

As used herein, the term "storage operating system" generally refers to the computer-executable code operable on a computer to perform data storage and retrieval functions and manage data access and may, in the case of a node 110, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. For example, the filter of the present invention can be implemented in a device driver for controlling I/O for a storage device. Alternately, or in addition, the filter can be implemented in a disk controller that causes the disk to access the physical locations used to store data.

Moreover, the teachings of this invention can be adapted to a variety of storage system architectures including, but not limited to, a network-attached storage environment, a storage area network and a disk assembly directly attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present invention may be utilized with any suitable file system, including a write in place file system.

In an illustrative embodiment, the storage server 365 is embodied as data module 130 of the storage OS 300 to service one or more volumes of the disk array 150. In addition, the multi-protocol engine 325 is embodied as network module 120 to (i) perform protocol termination with respect to a client issuing incoming data access request packets over the connection system 180, as well as (ii) redirect those data access requests to any storage server 365 in architecture 100. Moreover, the network module 120 and data module 130 cooperate to make architecture 100 a highly scalable and distributed storage system. To that end, each module includes a cluster fabric (CF) interface module 340*a,b* adapted to implement intra-cluster communication among the modules, including data module-to-data module communication for data container striping operations.

The protocol layers, e.g., the NFS/CIFS layers and the iSCSI/FC layers, of the network module 120 function as protocol servers that translate file-based and block based data access requests from clients into CF protocol messages used for communication with the data module 130. That is, the network module servers convert the incoming data access requests into file system commands that are embedded within CF messages by the CF interface module 340 for transmission to the data modules 130 in architecture 100. It is these file system commands that are used by the file system filter of the present invention to achieve filtering functions in accordance with filter definitions. Moreover, the CF interface modules 340 cooperate to provide a single file system image across all data modules 130 in architecture 100. Thus, any network port of a network module 120 that receives a request from client 170 can access any data container within the single file system image located on any data module 130 of architecture 100.

Further to the illustrative embodiment, network module 120 and data module 130 are implemented as separately scheduled processes of storage OS 300; however, in an alternate embodiment, the network and data modules may be implemented as pieces of code within a single operating system process. Communication between a network module 120 and data module 130 is thus illustratively effected through the use of message passing between the network and data modules although, in the case of remote communication between a network module 120 and data module 130 of different nodes, such message passing occurs over the cluster switching fabric 160. A known message-passing mechanism provided by the storage operating system to transfer information between network and data modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). An example of such an agnostic protocol is the SpinNP protocols available from Network Appliance, Inc.

In accordance with the present invention, a file, system filter framework is arranged in the above-described filer within node 110. The filter framework may be arranged in a number of configurations to take advantage of the above-described features of the filer.

Figure 4A:
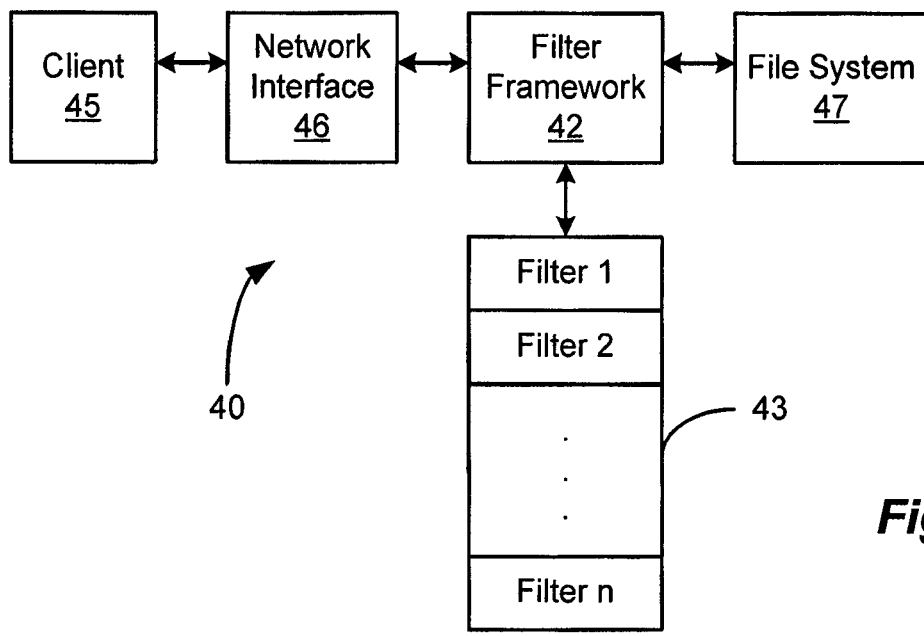
FIGS. 4a and 4b are block diagrams illustrating abstract locations of a filter framework within a network connected filer.
Figure 4B:
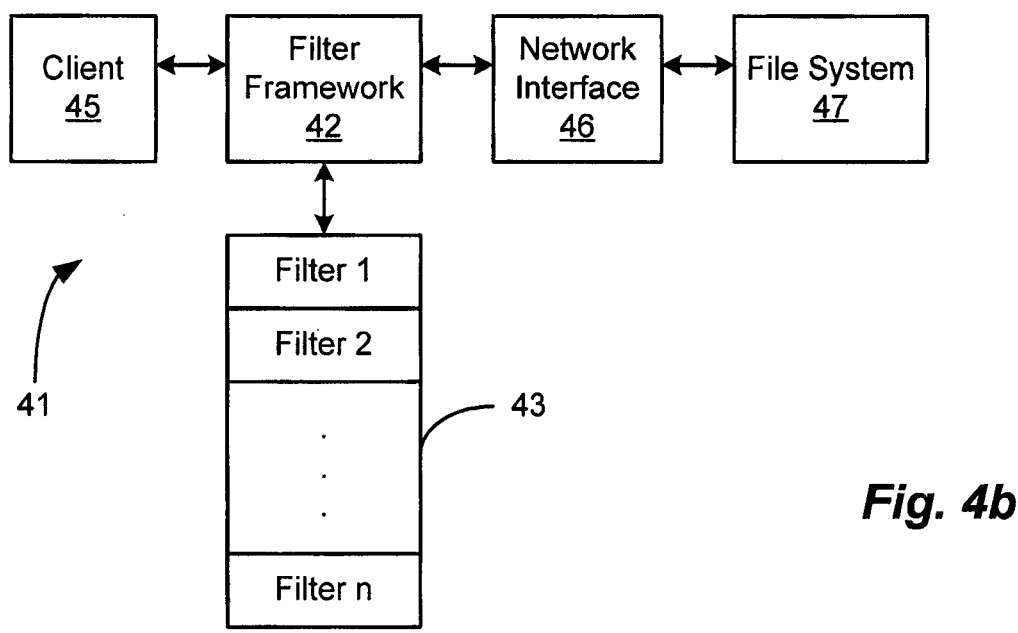

According to an embodiment of the present invention, a filter framework or architecture is provided for filter operations related to data access requests and responses to and from a filer. Referring to FIGS. 4*a* and 4*b*, filer systems 40 and 41 are shown, which include a file system 47. A filter framework 42 and filters 43 operate to provide filtering functions for filer systems 40 and 41. A client 45 provides requests for information from file system 47, and receives responses that may include data maintained in file system 47, or information about the data. The request and response for client 45 is directed through a network interface 46, which supports network addressing to route the request and response between client 45 and file system 47, as described above with reference to multi-protocol engine 325.

Figure 3:
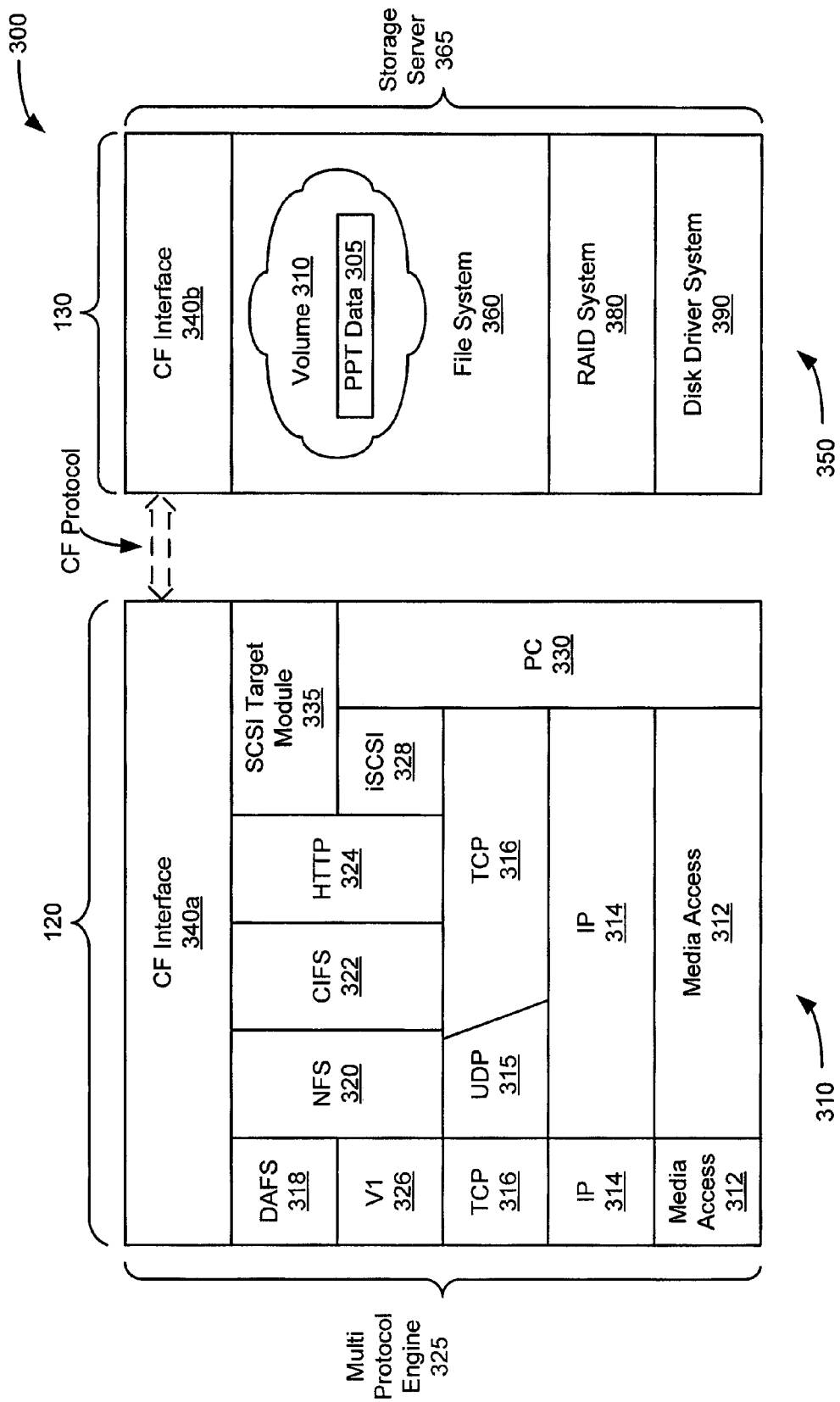
FIG. 3 is a diagram further illustrating a storage operating system.

File system 47 can be implemented as file system 360 illustrated in FIG. 3. File system 47 receives requests and provides responses with the same mechanisms as file system 360, as described more fully above. Filter framework 42 intercepts requests and responses and invokes one or more of filters 43 in accordance with the request or response information. The present invention may also provide various components to realize filter functions, some of which may be represented as being located in file system 47, or between components of file system 47, as described in greater detail below.

Filter framework 42 is implemented in node 110, and may be realized as part of storage OS 300 shown in FIG. 2. Accordingly, processors 222*a, b* may execute instructions related to filter operations. In addition, as illustrated in FIGS. 4*a*, 4*b*, filter framework 42 can be represented as being located in the data path prior to or after network module 310, shown in FIG. 3. Components of the network filter system can be implemented in disk module 350 to permit direct filter access to requests and responses for file system 47, as discussed in greater detail below.

Figure 5A:
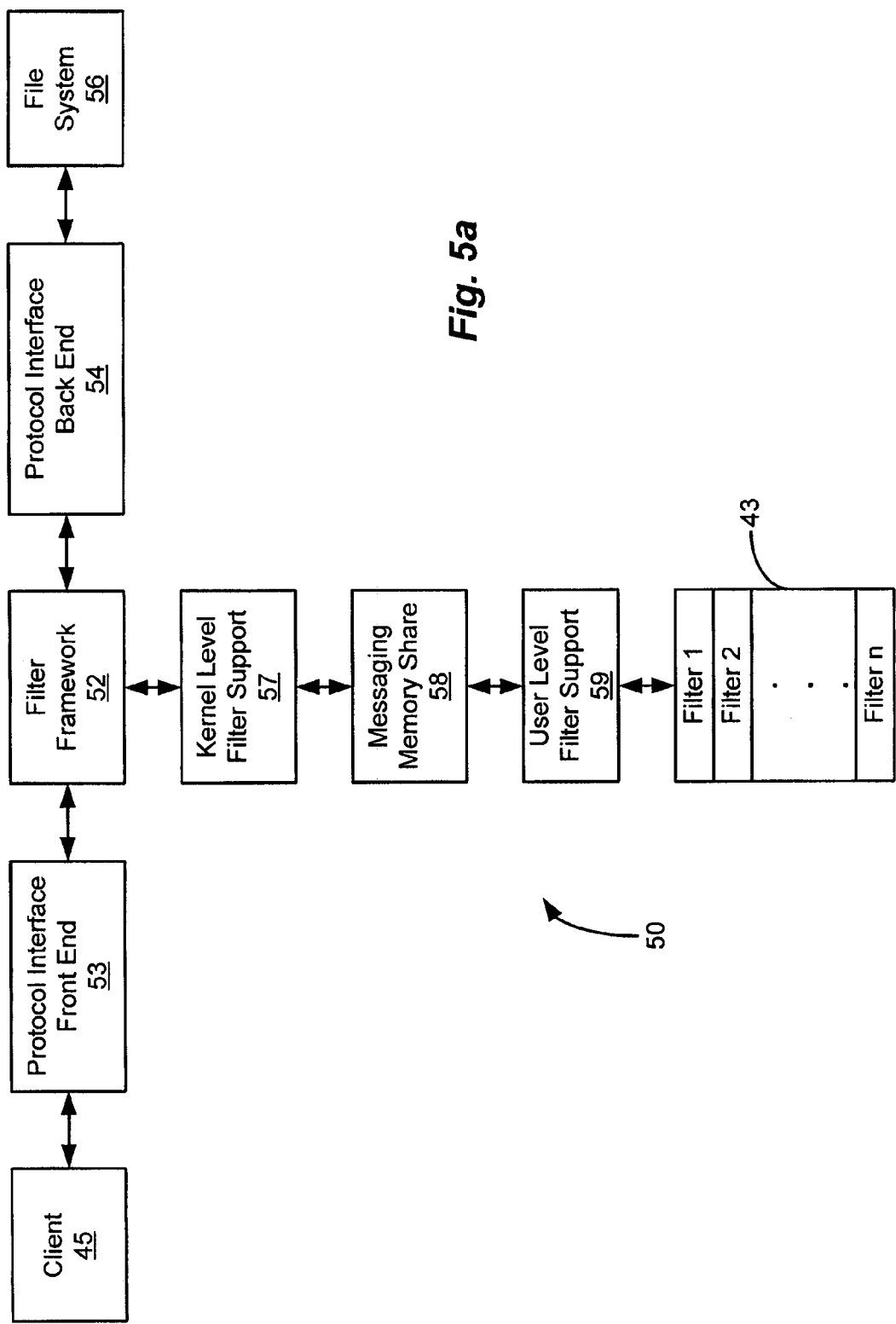
FIGS. 5a and 5b are diagrams illustrating a filter framework interaction with a protocol interface.
Figure 5B:
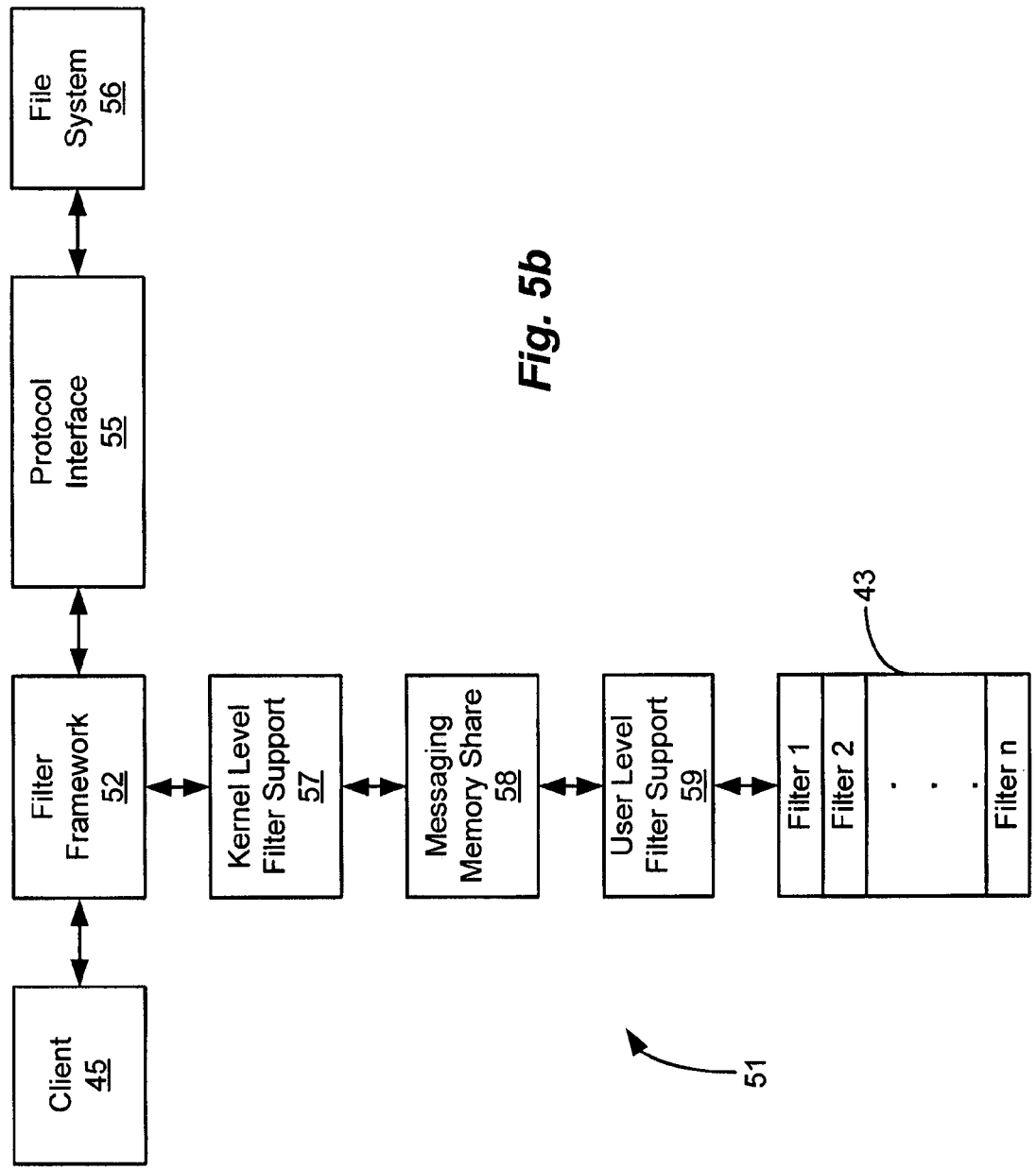

Referring now to FIGS. 5a and 5b, a dataflow 50 and 51 for embodiments of a network filter system architecture is shown. Dataflow 50 includes a protocol interface front end 53 and a protocol interface back end 54, between which is inserted a filter framework 52. Protocol interface front end 53 can be implemented as multi protocol engine 325 illustrated in FIG. 3, while protocol interface back end 54 can be implemented as CF interface module 340b of data modules 130. Accordingly, filter framework 52 is represented as being inserted between CF interface modules 340a,b to intercept system commands to data module 130, as well as to intercept responses from data module 130.

For data flows from client 45 to file system 56, dataflow 50 typically commences with a request from client 45, which request is delivered to protocol interface front end 53. Protocol interface front end 53 converts the request from the I/O request format into a system command, which is transferred to protocol interface backend 54 through filter framework 52. The system command is applied to file system 56 to generate a response. For data flows from file system 56, a system response from file system 56 is delivered to protocol interface back end 54, which response is then forwarded to protocol interface front end 53 through filter framework 52. Protocol interface front end 53 converts the internal system responses from protocol interface back end 54 to a protocol format suitable for transmission of the response data to client 45. Protocol interface front end 53 thus formats the system responses into standard file or block protocol forms, with the more typical file protocols being NFS and CIFS, and the more typical block protocols being iSCSI and FC. The request and responses being provided between client 45 and protocol interface front end 53 can be transmitted over an Ethernet or Fiber Channel network.

Filter framework 52 intercepts the system commands and responses between protocol interface front and back ends 53, to perform filtering functions. Upon intercepting a command or response, filter framework 52 enumerates filters 43 to make a call to each one in a given order. Filters 43 can be cascaded, and some may be in kernel space, as supported by kernel level filter support 57, while other filters may be in user space, as supported by user level filter support 59. Kernel level filter support 57 and user level filter support 59 interact to pass information for processing within the separate kernel or user modes, where the kernel and user modes are generally maintained separately. Kernel mode operations are typically configured as internal or system oriented operations, while user mode operations are typically undertaken by applications and user accesses. A user mode filter submits a request in user mode, which prompts a system call through kernel level filter support 57, which system call is handled in kernel mode. The kernel mode response provides kernel mode information to kernel level filter support 57, which in turn delivers user mode responses to user level filter support 59 for use with user mode filters.

Filter framework 52 uses a call model that is dependent upon the operation mode available for the called filter. The call models include a synchronous mode, in which the filter holds incoming I/O, and blocks the calling thread until processing is completed. An asynchronous mode also holds incoming I/O until processing is completed, but releases the calling thread. An asynchronous release mode permits filter calls in which the filter does not block incoming I/O or the calling thread. FIGS. 5a and 5b illustrate arrangements for filter framework 52 that can use the synchronous mode or the asynchronous mode.

Filter framework 52 also receives, or intercepts, responses from a file system 56 in a return path. File system 56 can be implemented as file system 360 or 47, as described more fully above. The responses prompt filter framework 52 to enumerate filters 43 and invoke the appropriate filter response callback. A callback represents instructions passed to the filter for execution, often to call other procedures or functions. For example, a callback to a filter may be in the form of a pointer to a function or procedure that is passed to the filter. Filter framework 52 ensures that I/O is properly ordered and in a form appropriate for requests and responses. Filters 43 are also ordered or prioritized, and include predefined tags to identify any I/O generated by filters 43. The use of tags to identify I/O requests contributes to simplifying processing of the prioritized filters. The I/O request tags indicate the source filter for the I/O request, as well as the priority associated with the filter making the I/O request. Filter framework 52 can appropriately allocate processing time for the I/O requests in accordance with their priority, based on an examination of the associated I/O tags.

Kernel level filter support 57 provides support for kernel mode filters, as well as providing kernel level services for filters 43. For example, kernel level filter support 57 organizes the input of request/response parameters and provides communication and status support on a system level for user level filters and user level filter support 59. Kernel level filter support 57 provides status information to filter framework 52 related to the status of user level filter support 59 and user level filters located within filters 43.

Messaging memory share 58 is a communication device used to transfer data between kernel space and user space to contribute to supporting user level filters. The communication used by messaging memory share 58 can take a number of forms, including a specified shared memory, input/output control (IOCTL) or an IPC socket connection, as examples. The communication mechanisms are used to transfer parameters from kernel level filter support 57 to user level filter support 59, as well as to return status to kernel level filter support 57.

User level filter support 59 receives request/response parameters from kernel level filter support 57, enumerates user level filters and invokes user level filter callouts. User level filters in filters 43 register with user level filter support 59 to obtain request and response callbacks related to the filter operations. User level filters 43 can be located locally or remotely, depending upon their implementation. For example, a filter 43 can be located in the same file system node as OS 300. A filter 43 that is remotely located may be in another file system node 110, or in any remote filer or file system architecture 100 (FIG. 1), as well as in other external systems. Remote filters can be useful in implementing filtering operations in systems with special purpose applications that are not typically implemented with OS 300. For example, an email application may use information from filer systems 40 or 41 (FIGS. 4a, 4b), and can implement filters for the information on a remote basis under control of the email application. In either case of local or remote filters, filters 43 register with user level filter support 59 to receive execution calls based upon request or response parameters. The calls may include arguments such as pointers to data structures related to the request or response.

The request parameters may include such components as file operation (read, write, etc.), file name and volume that are the target of the operation, file operation parameters, user credentials and time, as examples. The request parameters may also include the origin source, such as a source IP address, a source host name, CIFS export, NFS export, iSCSI or Fiber Channel related parameters. The response to user level filter support 59 may include parameters such as status and error codes, data from file system 56 in the case of a read operation, and attributes related to the data or the response.

The status provided to user level filter support 59 may include an error code, indicating an operation failure, as an example. The absence of an error code indicates success of an operation. The status may also indicate that filter processing should continue, or that the operation is pending, such as may be the case when a filter is awaiting the completion of further processing. The status may also indicate that further filter processing may be skipped. User level filter support 59 invokes user level filters included in filters 43 with a request or response callout. The various user level filters may provide status indications upon a request or response callout, as indicated above.

For control flow purposes, if the filter indicates a status of "return with error code" the call flow returns to user level filter support 59, which is processed through messaging memory share 58, to return flow to the original request from client 45, which may be pending in kernel level filter support 57. If the filter indicates a status of "continue," the callout returns to user level filter support 59, which can then call the next user filter in the filter order. If the filter indicates a status of "return with pending operation," user level filter support 59 holds the current operation and returns a status back to messaging memory share 58 and filter framework 52 to hold the filter callout, but release the calling thread back to protocol interface front end 53. When the pending operation of the filter is completed, the filter provides an indication to user level filter support 59 to resume filter callouts.

Once all filters 43 have been called and returned to user level filter support 59, a status is sent through messaging memory share 58 to signal kernel level filter support 57. Kernel level filter support 57 returns a status to filter framework 52 that indicates how filter framework 52 should further direct the control flow. For example, filter framework 52 can forward a current request to protocol interface back end 54 and to file system 56, depending upon whether permitted by the status returned to filter framework 52. Protocol interface back end 54 provides responses to filter framework 52, as provided by file system 56, which responses may include requested data or information about data in file system 56. Filter framework 52 can then initiate response callback processing, similar to the request callback processing described above. The response provided by file system 56 is the source for initiating the response flow path, which ultimately provides a response to client 45.

The operations described above with respect to dataflow in FIG. 5*a* are similar to those provided in dataflow 51 shown in FIG. 5*b*. Dataflow 51 illustrates filter framework 52 interposed between client 45 and protocol interface 55, rather than between a protocol interface front end 53 and protocol interface back end 54, as shown in FIG. 5*a*. Accordingly, protocol conversion is completed within protocol interface 55 to convert between local network protocols and internal system protocols. Filter framework 52 receives the external request and provides the eternal response with client 45. Accordingly, filter framework 52 intercepts network traffic with one or more of an Ethernet interceptor or Fiber Channel interceptor. Filter framework 52 in FIG. 5*b* can thus intercept network traffic from a network module 120, such as by intercepting communication from network adaptor 225 shown in FIG. 2.

Filter framework 52 then converts NFS or CIFS requests and SCSI commands from iSCSI or Fiber Channel into a general request for use by protocol interface 55. Similarly, in the response flow path, filter framework 52 converts the return response from protocol interface 55 to forms usable with NFS or CIFS as well as SCSI commands.

Figure 6A:
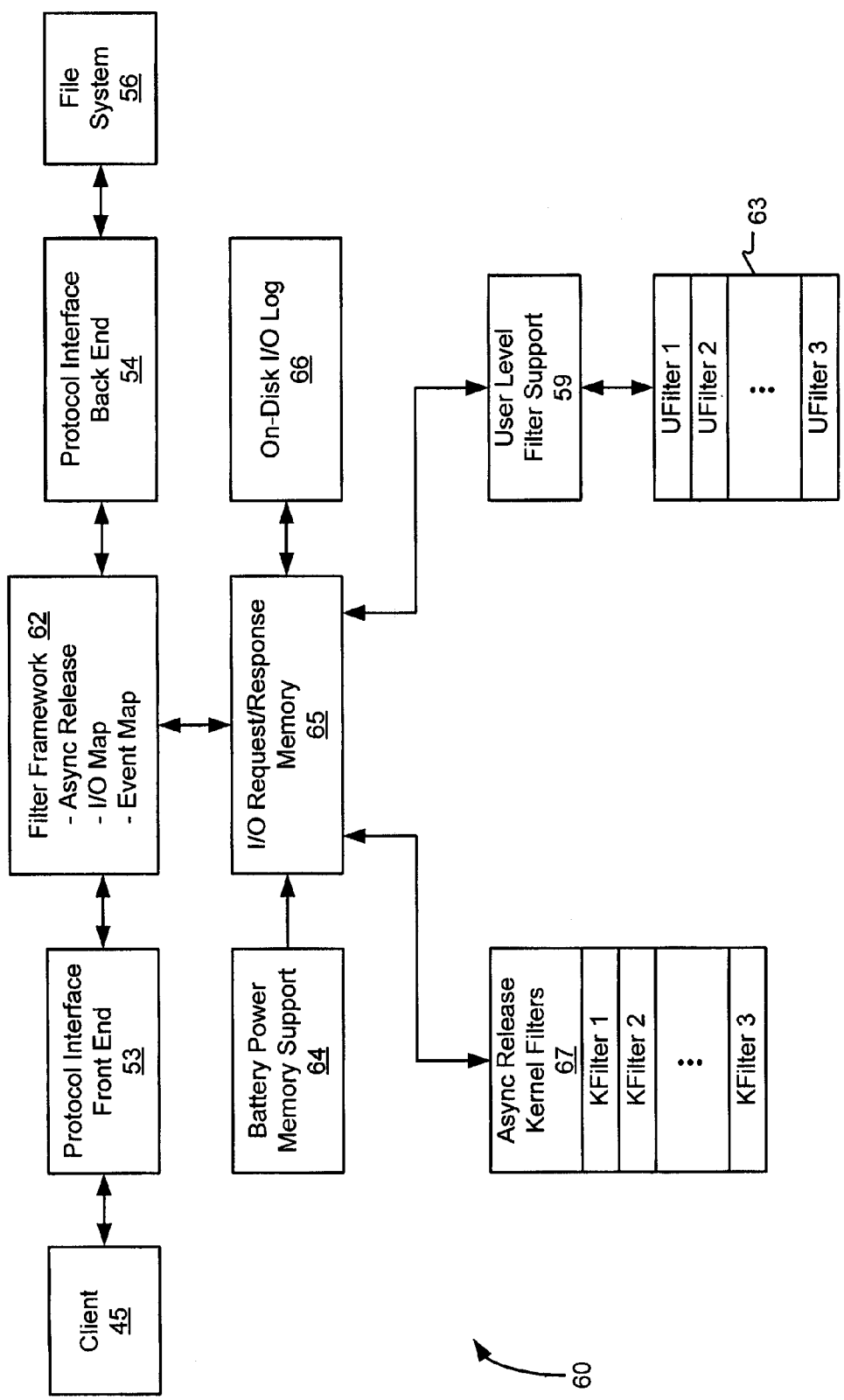
FIG. 6a is a block diagram illustrating an asynchronous release mode configuration for the filter framework in accordance with the present invention.

Referring now to FIG. 6*a*, a dataflow 60 for an asynchronous release mode embodiment of a filter framework for a filer is shown. The dataflow typically commences with a request from client 45, which is delivered to a protocol interface front end 53. Protocol interface front end 53 provides conversion from the I/O request format into a system internal request. Protocol interface front end 53 also provides conversion for responses from internal system responses to an I/O response in accordance with the chosen protocol. Typical protocols include NFS and CIFS, with the request and responses being provided between client 45 and protocol interface front end 53 typically through an Ethernet or Fiber Channel network. The converted internal system requests are delivered to filter framework 62 for filter processing.

Filter framework 62 enumerates filters 63, 67 to make a call to each one in a given order, depending upon the request. Filters 63, 67 can be cascaded, and some may be in kernel space, as indicated by kernel filters 67, while other filters, such as user level filters 63, may be in user space. User level filters 63 are supported by user level filter support 59. Filter framework 62 uses the asynchronous release call model, which permits filter calls in which the filter does not block incoming I/O or the calling thread. An address space in filter framework 62 provides a location for storing I/O information to contribute to permitting the filter to free I/O resources and threads. Filter framework 62 also receives responses from file system 56 in a return path. The responses prompt filter framework 62 to enumerate filters 63, 67 and invoke the appropriate filter response call back. Filter framework 62 ensures that I/O is properly ordered and in a form appropriate for requests and responses. Filters 63, 67 are also ordered, and include predefined tags to identify any I/O generated by filters 63, 67.

The address space in filter framework 62 includes an I/O map for use by filters that can operate in asynchronous release mode. The filters register for the type of I/O they desire, such as I/O for a synchronous call, or I/O for an asynchronous release call. The I/O map is used by filters to pass parameters in the asynchronous release mode to permit associated I/O and calling threads to be released.

Filter framework 62 also includes an event map that contributes to determining when and how a registered filter should be called. While the I/O map includes the registered callbacks for the registered filters, the event map provides information concerning when a particular callback is made. The event map is a data structure that holds identifiers for filters and filter characteristics, such as an indication of whether a filter is a remote filter. A filter call results from an evaluation of an expression that involves information taken from the I/O map and the event map. The determination of when and how to call a filter can be advantageous when filter calls generate significant amounts of control traffic in the filter framework, the file system or the network connections. For example, a user mode filter may register as a remote filter, which may be located at a different physical location from the filter framework. These types of remote user mode filters are discussed above with reference to FIGS. 5*a*, 5*b*. Because of the distance and the connection latency involved with calling a remote filter, a significant delay can be caused due to data traffic generated in calling the remote filter. Accordingly, it may be expeditious to avoid calling the remote filter with every pass through the filter call cascade. It may be more desirable to produce calls to such a filter based on conditioned events, as provided by the evaluated expression involving the I/O map and the event map in filter framework 62.

To avoid invoking a filter callback in undesirable circumstances, a combination of data taken from the I/O map and event map is used to produce a logical expression of when a filter should be called. The logical expression is evaluated in filter framework 62 to permit or defer a filter call. For example, a request from client 45 may include I/O information for which filter Ufilter1 in filters 63 has registered a call. Upon receiving the request, filter framework 62 consults the I/O map to determine that Ufilter1 has requested a call based on the registered I/O information. Filter framework 62 then evaluates an appropriate logical expression as indicated by the registered call by Ufilter1 and an entry in the event map for Ufilter1 that describes how Ufilter1 should be called. Based on the result of the expression evaluation, filter framework 62 will permit or defer the call to Ufilter1.

The I/O map includes the I/O callbacks available for the given registered filters. The event map provides criteria related to the filter registration to permit construction of a determination for invoking a filter call. The event map may include various parameters to contribute to building an expression that can be evaluated to determine when the filter callback should occur. Exemplary parameters include user credentials, client IP or source address, time/date information, a volume/directory/file designation for the I/O that is targeted, CPU/memory resources available at the time and update totals such as total desired updates for a given volume. Filter framework 62 evaluates the expressions composed of the event map parameters in combination with the I/O map to determine when a filter should be called. The conditioned calling of a specified filter helps to avoid message traffic congestion and improve overall filter operation.

An I/O request/response memory 65 is coupled to filter framework 62 to store request or response parameters. A number of request parameters may be saved in memory 65, such as file operation, filename and volume for the target of the operation, operation parameters, user credentials or time of request. Other parameters that may be saved in memory 65 include source information, such as an IP source address or a source host name. Parameters may also include protocol dependent information related file access protocols such as CIFS or NFS export. Block based protocol parameters such as luns may also be stored, for protocols such as iSCSI or Fiber Channel, for example. Examples of file operations include read, write and get attributes. Response parameters that are saved in memory 65 may include status and error codes, as well as data related to a read operation and attributes. If memory 65 becomes full, or fills to a given threshold, a flush to I/O log 66 occurs to free memory and retain I/O request/response parameter data. A flush is an operation to write data from one memory storage to another memory storage to preserve a state of the data, such as by saving changes to data held in a cache to a disk storage. Memory 65 may be battery backed by battery power memory support 64 to provide persistent parameter memory.

After a request callout to a filter, filter framework 62 need not wait for a filter return to continue processing. If status permits, the current request is forwarded to protocol interface backend 54 and on to file system 56. Responses from protocol interface backend 54 delivered to filter framework 62 are used to call up filter response processing in the same way as filter request processing. Again, filter framework 62 need not wait for a filter return from a filter response handler to continue processing.

Kernel filters 67 are invoked by filter framework 62 using memory 65. The filter invocation involves request and response callouts using a communication structure in memory 65 that is specific to kernel filter callout. An example of the protocol with the communication structure is SpinNP discussed above. Kernel filters 67 register with filter framework 62 for I/O requests and responses in asynchronous release mode. The parameters for the I/O components of the request and response are similar to those parameters for user level filters described above.

User level filter support 59 also receives request/response parameters from memory 65, enumerates user level filters 63 and invokes user level filter callouts. User level filters 63 register with user level filter support 59 to obtain request and response callbacks related to the filter operations. User level filters 63 may be locally or remotely located, as discussed above with respect to FIGS. 5*a*, 5*b*. The request parameters may include such components as file operation, file name and volume for the operation target, file operation parameters, user credentials and time. The request parameters may also include information related to the origin source, such as a source IP address or a source host name. The request parameters may also include CIFS export or NFS export file based requests. Alternately, or in addition, the request parameters may include block-based requests, such as those based on iSCSI or Fiber Channel. In general, any available parameters desired for filter operation may be registered with user level filter support 59. The response to user level filter support 59 may include parameters such as return status and error codes, data from file system 56 in the case of a read operation, and attributes related to the data or the response. The return status provided to user level filter support 59 does not matter in asynchronous release mode, since filter framework 62 need not wait for a filter return to continue processing.

Filter framework 52 can forward a current request to protocol interface back end 54, depending upon whether permitted by the status returned to filter framework 52. Protocol interface back end 54 provides responses to filter framework 52, which can initiate the response callback processing, similar to the request callback processing described above. Protocol interface back end 54 also routes current requests and responses to and from file system 56. File system 56 processes incoming requests, applies them to the data storage system and receives a response, which is forwarded to protocol interface backend 54. This sequence provides the initial steps in a response flow path that ultimately provides a response to client 45.

Figure 6B:
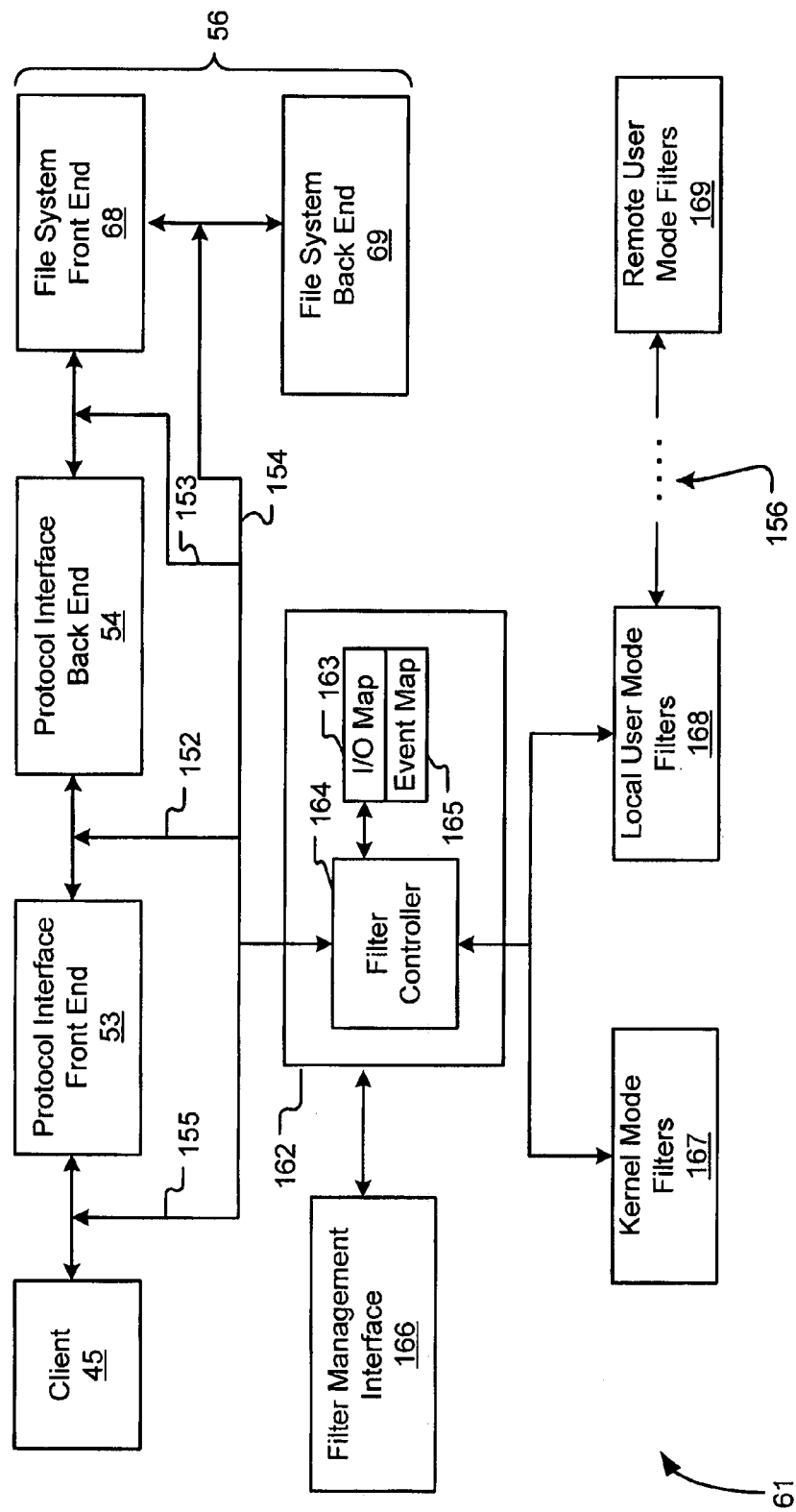
FIG. 6b is a block diagram illustrating points in a filer system at which a filter framework may be operatively coupled.

Referring now to FIG. 6*b*, a filter framework 162 is illustrated as being "hooked into" or coupled to the filer system, represented as a filer 61, in one or more of a variety of locations. In this exemplary embodiment, filter framework 162 is implemented as a single binary executable application that is coupled to the filer 61 at points 152-155. A single binary executable application is a standalone instruction code that can be compiled as a separate module, for example. Filer 61 is represented as having a file system front end 68 and a file system back end 69. File system front end 68 corresponds to a file system layout structure, such as WAFL, for example, as well as a messaging interface suitable for high performance messaging with such protocols as SpinNP, as discussed above. File system back end 69 corresponds to a hardware oriented interface, for such systems as may provide functions for flushing, RAID and volume management.

Point 152 represents filter framework 162 coupled to filer 61 between protocol interface front end 53 and protocol interface back end 54. Point 153 represents filter framework 162 coupled to filer 61 between protocol interface backend 54 and a file system front end 68. Point 154 represents filter framework 162 coupled to filer 61 between file system front end 68 and file system back end 69. Point 155 represents filter framework 162 coupled to filer 61 between a client 45 and protocol front end 53. Point 155 can be a network interface that receives/sends requests/responses based on a number of protocols, including file and block oriented protocols. A filter controller 164 provides a construct for coupling filter framework 162 to filer 61. The coupling points or "hooks" 152, 153 and 154 may be provided through interaction with messaging mechanisms that exist between protocol interface front end 53, protocol interface backend 54, file system front end 68 and file system back end 69. Each point 152, 153 and 154 has a separate queue within filter framework 162 on a per-volume basis. Accordingly, queues for points 152, 153 and 154 may be maintained within filter framework 162 for each volume established within file system 56'. The queues represent organized call structures for calling filters that are to be activated at the specified points 152, 153 or 154. Because different information may be available depending on where a filter is hooked to points 152, 153 or 154, a request from client 45 and response from file system 56 can be captured along the data path where pertinent information is available in relation to specific filter operation. For example, a filter hooked to point 152 can obtain protocol related information from protocol interface front end 53 to permit filter operations in relation to protocol information, such as IP or network external addresses. Similarly, points 152, 153 or 154 permit filter operations on a block access basis, rather than a file access basis alone.

A filter may be hooked into one or more points 152, 153 or 154 depending upon entries in the respective queues for calling the specified filter. A filter management interface 166 indicates to filter framework 162 where a filter should be hooked into filer 61. Filter management interface 166 can indicate to filter framework 162 that a filter should be added to or removed from a queue for one or more of hooking points 152, 153 or 154. Filter framework 162 provides an Application Programming Interface (API) to abstract the private details of hooking points 152, 153 and 154. Filter management interface 166 uses the API to indicate where an inserted filter should be hooked. The operational mode of the filter and registration information for filter calls. The registration information may include request/response parameter extractions used in filter operations and full path name extractions, which can be file or block oriented. The filter operation mode can be asynchronous or asynchronous release, depending upon a selection of hooking points 152, 153 or 154. Also depending upon filter operation mode, one filter can be inserted into multiple hooking points to operate simultaneously at those hooking points.

The hook points for filter framework 162 to be coupled to filer 61 need not be active if a given queue or queues for one or more of hooking points 152, 153 or 154 is empty. That is, if there is no filter call in a given queue, no change occurs in the operation of filer 61 relative to the associated hooking point. When filter management interface 166 notifies filter controller 164 that a filter should be inserted into a given hooking point, filter controller 164 puts a call for the specified filter into the specified queue for the associated hooking point 152, 153 or 154. Filter controller 164 then enables a data path intercept for the associated hooking point 152, 153 or 154.

The organization of filter framework 162 with multiple hooking points permits a filter that is single-source based, meaning it is compiled as a self-contained module, independent of desired hooking points. The configuration of filter framework 162 permits the filter to be inserted at selectable hooking points, without reconfiguring the filter code, or recompiling the filter module. Placement of a given filter into a queue for an associated desired hooking point can take place after loading of the filter, or as part of the loading procedure.

Kernel mode filters 167 can take advantage of filter framework 162 being coupled to filer 61 at points 152-155 to interact with particular filer components. Points 152-155 at which filter framework 162 is coupled to filer 61 permit kernel mode filter interaction with components of filer 61. The hooking locations include points within or before a protocol server, between the protocol server and a messaging interface for communicating with data storage devices or located between the messaging interface and the data storage devices. As discussed above, kernel mode filters 167 can be single source based, and compiled once, but placed into filer at different points 152-155 of interaction. User mode filter applications can be of two types, local user mode filters 168 and remote user mode filters 169. Local and remote user mode filters 168, 169 may similarly interact with filer 61 at hooking points 152-155. Local and remote user mode filters 168, 169 operate through a user level filter support, which interacts with a kernel level filter support to make system calls or provide system oriented operations for local and remote user mode filters 168, 169. Remote user mode filters 169 may be located at a physically remote site, or on a separate filer system that may be connected to filer 61 through a network connection, such as through cluster switching fabric 160 or connection system 180, illustrated in FIG. 1. In FIG. 6b, remote user mode filters 169 are illustrated as being available at a same level as local user mode filters 168 through a connection 156, since remote user mode filters 169 interact with filter controller 164 and filter framework 162 similarly to local user mode filters 168. Because remote user mode filters 169 are registered with filter framework 162 as remote filters, an I/O map 163 and an event map 165 may be used to provide a determination of when remote user mode filters 169 are actually called, as discussed above with respect to filter framework 62 in FIG. 6a.

In addition to having a selectable insertion point 152-155 for a filter to be coupled to filer 61, each filter 167-169 may be compiled with a flag to indicate a desired hooking point 152-155. This compile time feature avoids user or administrative interaction through filter management interface 166 to indicate to filter framework 162 where the given filter should be hooked. Filter controller 164 calls filters 167-169 in a given order, which can depend upon priority, or location within a queue, for example. Because filter priority can vary among the filters in the different queues, a filter call to the next filter in a queue may be delayed while higher priority filters in other queues are called and permitted to complete processing. Accordingly, filter call order depends upon several factors including priority and queue order. Calls to a given one of filters 167-169 can be triggered by other filters, or can be based on calls or callbacks from filter controller 162 as indicated by the specific I/O activities for which the specified filter registers. Filters 167-169 are typically associated with a particular volume or snapshots for a particular volume.

Figure 7:
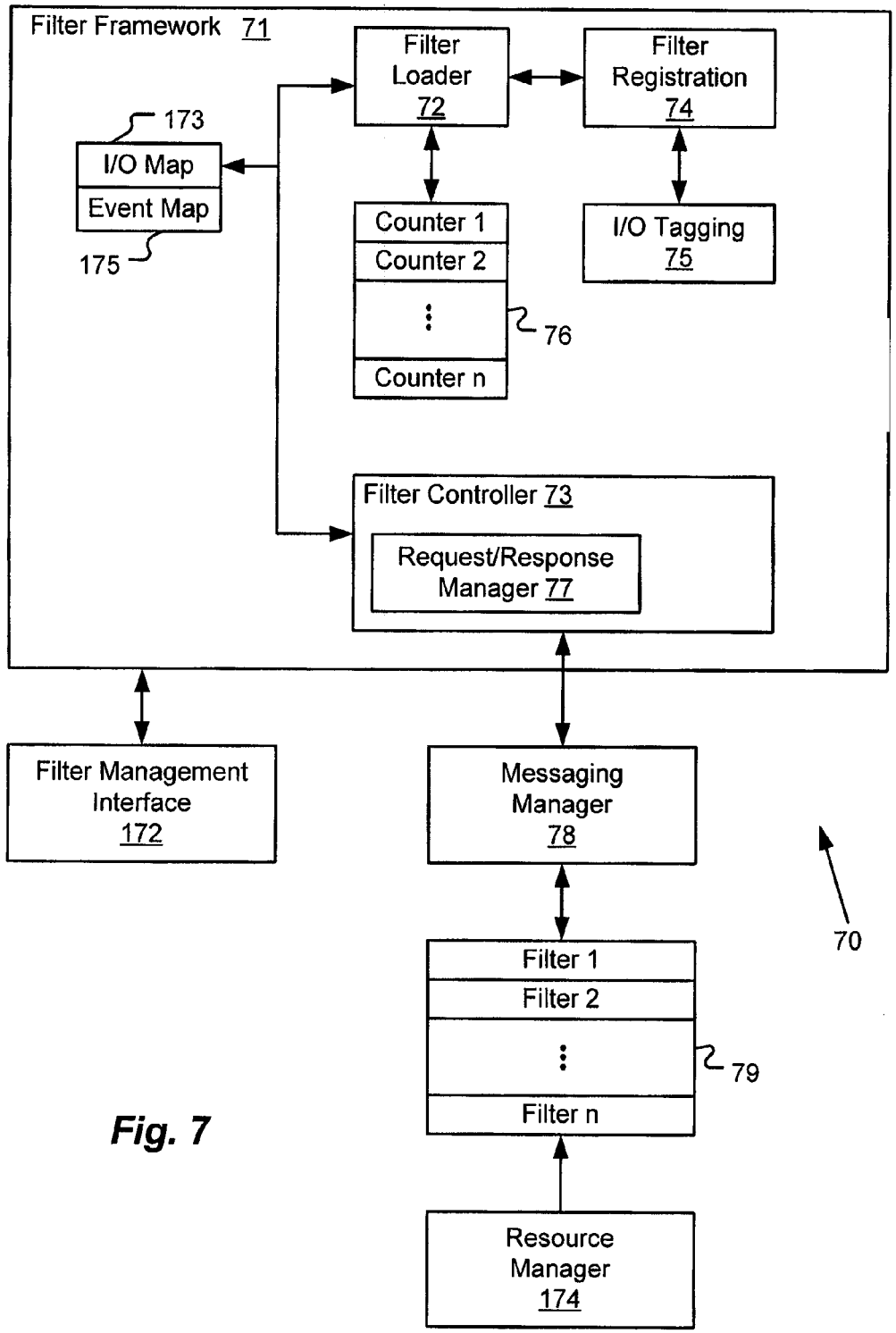
FIG. 7 is a block diagram illustrating a filter framework embodiment in accordance with the present invention.

Referring now to FIG. 7, a configuration 70 for a filter framework 71 is illustrated. Filter framework 71 includes a filter loader 72, a filter controller 73, a filter registration 74, an I/O tagging 75 and I/O and event maps 173, 175. Filter loader 72 includes a number of counters 76, one for each registered filter. Filter controller 73 includes a request/response manager 77 that contributes to handling request and response callbacks. Filter controller 73 communicates with filters 79 through a messaging manager 78. Messaging manager 78 provides high performance messaging between filter controller 73 and filters 79, and may be realized through one or more communication formats such as shared memory, input/output control (IOCTL) or IPC socket connection, for example. These communication formats provide a structure for the transfer of parameters from filter controller 73 to filters 79, as well as for the return of status to filter controller 73.

Upon callout, filters 79 may take advantage of a resource manager 174. Resource manager 174 is made available for handling a variety of filter functions at both a user level and a kernel level. Exemplary features included in resource manager 174 are management components for managing threads, memory, resource locking, file I/O, volumes/snapshots, sessions, names and messaging.

Filter controller 73 includes a watchdog timer (not shown). The watchdog timer is a mechanism for determining if filters 79 are responding properly. The watchdog timer is started or reset when filter controller 73 calls a filter, and times out if the filter does not properly respond within the time frame defined by the watchdog timer time interval. If the watchdog timer times out, the filter is considered unresponsive and is skipped for further calls in the filter order. The watchdog timer can be implemented as a timer interval or as a counter with a given value that counts at a given rate.

Filter loader 72 registers a filter with filter controller 73 through filter registration 74 and identifies resources to be used for filter operations. Filter framework 71 can freeze I/O during loading and unloading or starting and stopping a given filter. For example, filter framework 71 can maintain a buffer (not shown) to permit filter related I/O to be halted and stored while the filter changes state, such as from "loaded" to "started." In accordance with an exemplary embodiment according to the present invention, a filter can be automatically upgraded using the starting, stopping, loading and unloading functions provided by filter framework 71 and filter loader 72. A prior version of a filter is stopped to avoid generating additional I/O requests. Any pending I/O requests are buffered in filter framework 71. After receiving a confirmation that the prior version filter is stopped, filter loader 72 unloads the prior version filter, and loads an updated version filter. Once filter loader 72 confirms that the updated version filter is properly loaded, filter framework 71 starts the updated version filter. Once filter framework 71 confirms that the updated version filter is started, the I/O requests are permitted to continue. The continued I/O requests may be derived from the buffer provided by filter framework 71.

Filter loader 72 provides a counter 76 for each filter 79 to permit tracking of I/O operations in the event of a filter unload. Filter framework 71 tracks and completes filter I/O prior to unloading the specified filter. A counter 76 maintained for each filter 79 counts I/O events, and counts down to zero to indicate all I/O processing has been completed, and that the filter is ready for unloading. Filter loader 72 also identifies I/O associated with registered filters through I/O tagging 75, so that filter I/O requests and responses can be identified to avoid conflicts.

Filter framework 71 also includes an I/O map 173 and an event map 175 that operate together to determine when and how a registered filter should be called. I/O map 173 includes information related to callbacks for registered filters based on I/O events. Event map 175 provides criteria for determining when a filter should be called. Even map 175 is aware of the characteristics of registered filters, which contribute to formulating a logical expression that can be evaluated to determine when a filter should be called. The expression can include elements from I/O map 173, so that calls to registered filters can be made or deferred based on how requested I/O events are processed. For example, a user mode filter may register as a remote filter in filter registration 74. The remote filter may be located at a different physical location from filter framework 71. To avoid data traffic tie-ups or processing latency that is typical of remote processing, calls to the remote filter may be deferred until a given set of I/O events are ready for processing or until other conditions are met, as defined by the expression evaluation determined by I/O map 173 and event map 175.

Filter framework 71 is also coupled to a filter management interface 172 for user access to filter framework 71. Interface 172 may include an API for users to manage filter functions, such as loading or unloading filters using filter loader 72.

Figure 8:
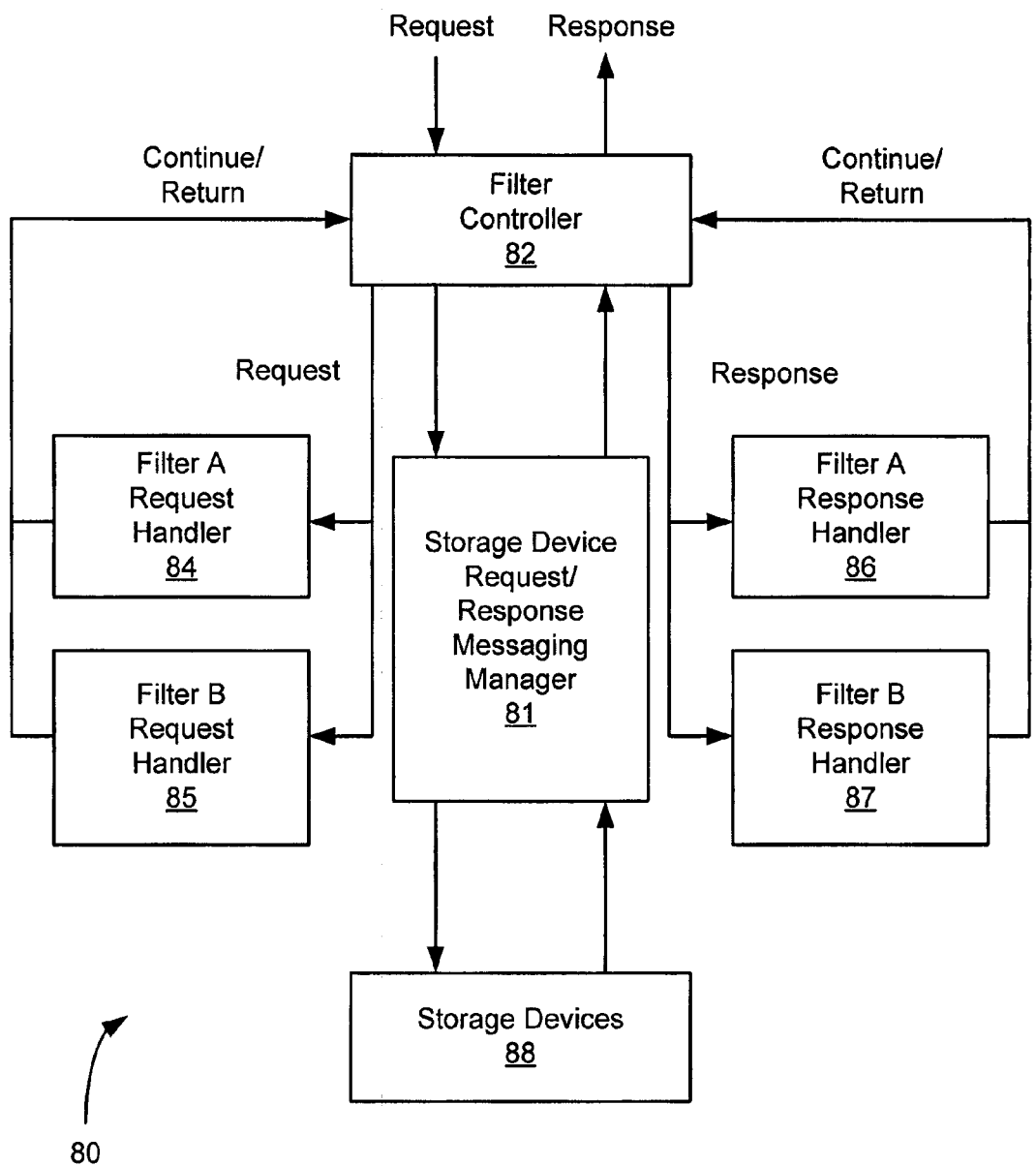
FIG. 8 is a block diagram illustrating request/response operations with a filter controller and filter handlers.

Referring now to FIG. 8, a request/response dataflow 80 is illustrated. Filter controller 82 intercepts requests to a file system and storage devices 88 and make filter calls to filter request handlers 84, 85. Request handlers 84, 85 begin processing filter functions upon receipt of a request. Request handlers 84, 85 also provide a status to filter controller 82 that indicates how filter controller 82 should continue processing. For example, the status may include an error code indicating that a filter operation did not complete successfully. Filters A and B can be user or kernel mode filters.

Filter controller 82 forwards requests to messaging manager 81, which is a high performance messaging protocol system for requests and responses of storage devices 88. Responses from storage devices 88 are returned to filter controller 82 through messaging manager 81. Once filter controller 82 receives a response, response handlers 86, 87 may be invoked to process the response. Response handlers 86, 87 provide status information to filter controller 82 related to the response processing to indicate how filter controller 82 should proceed with processing.

In accordance with the present invention, an exemplary filter that may be used with the filter framework exposes metadata information that is normally difficult to obtain or dynamic in an active file system. The inodes, directories and information about which blocks of the volume are allocated, free, etc., as well as block checksum information, collectively form system information metadata. An allocated block is one that is assigned to store specific data, while a free block is one that is unallocated and available to be assigned to store specific data. The metadata may be public or private, that is, being typically made available to users or not. Some metadata is stored in specially named files stored on the volume and, in some cases, in specific locations on the volume, such as in a "volume information block," as is well known in the art.

Figure 9:
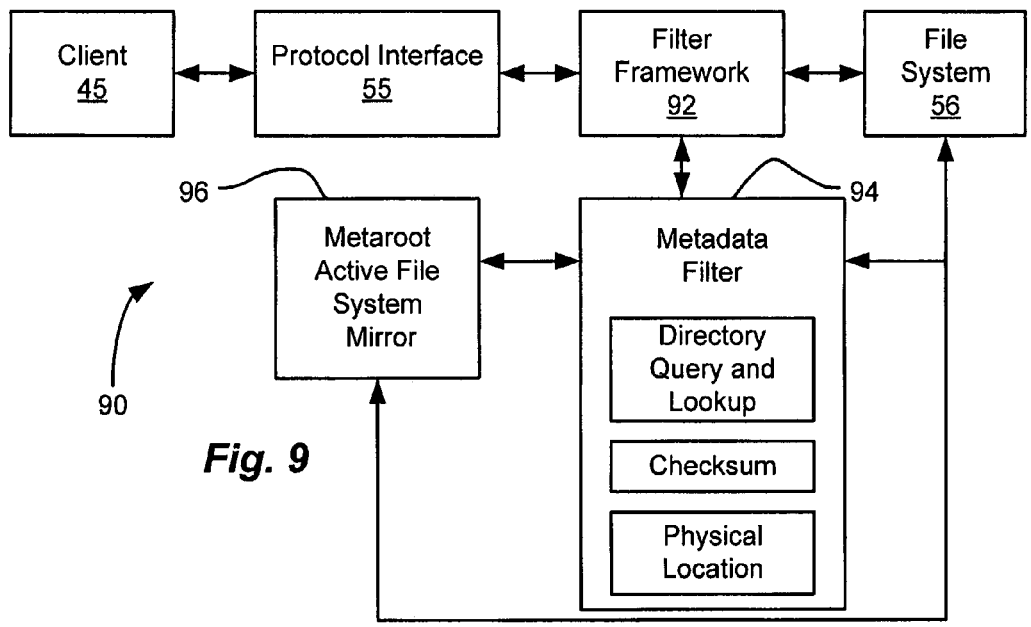
FIG. 9 is a block diagram illustrating a filter to expose metadata in a filer.

Referring now to FIG. 9, a block flow diagram shows a filter system 90 with data flow paths for an exemplary filter. A client 45 provides a request for metadata information from file system 56 using typical access protocols, such as NFS or CIFS. In accordance with the present invention, several options may be provided to client 45 for accessing metadata information, such as checksum data, physical location data or block access history data. The request is forwarded through protocol interface 55 to filter framework 92. Filter framework 92 can be similar to filter framework 52 depicted in FIGS. 5a, 5b and operates as described above to provide a filter call mechanism for registered filters. Client 45, protocol interface 55 and file system 56 are the same as those depicted and described with reference to FIG. 5b, with protocol interface 55 being located between client 45 and filter framework 93 rather than between filter framework 52 and file system 56.

Metadata filter 94 has two basic components, a virtual namespace to store metadata information in the form of a directory structure that mirrors a directory structure in file system 56, and metadata generation. The request from client 45 can specify a particular file or a set of files in given directories. For example, a user may change directories, such as by traversing a directory tree, to reach a particular directory in file system 56. The particular directory that the user reaches or specifies in a command to invoke metadata filter 94 provides the context for the request and for populating the virtual namespace. Metadata filter 94 creates a mirror directory structure in the virtual namespace based on the directory specified by the context of the request or the current user directory, and provides metadata information that can be accessed by the user in the mirror directory structure. For example, if the user specifies a directory "dir1\dir2\dir3" for a metadata information request, metadata filter 94 creates a mirror directory structure dir1\dir2\dir3 in the virtual namespace, and provides the requested metadata information in dir3 of the mirror directory structure. In this example, dir1 is a metaroot directory, meaning that dir1 is a root directory for purposes of the virtual namespace. The metaroot serves as a convenient reference point for the mirror directory structure.

A number of different metadata filters may be provided in filter system 90, and filter framework 92 tracks or maps the different filters and the different metadata information exposed by each filter. Metadata filter 94 operates with a specific metadata request from client 45, which request can be in the form of a command ending in ".checksum" for a specified file or group of files, for example. The request produces an I/O directory query that is forwarded to protocol interface 55, and then to filter framework 92. The request forwarded to filter framework 92 is in the form of an internal request from a file system callout, as produced by protocol interface 55. In an open system, i.e. a system with standardized programming or protocol interfaces, the internal request can be a system call, a vnode operation or a file operation from an I/O manager. A vnode is a generic representation of a file handle. Filter framework 92 receives the internal request and determines the filter call model from the options of synchronous, asynchronous or asynchronous, release modes. The directory query and lookup request prompted by a checksum or physical location metadata information request causes filter to create a namespace with a metaroot that permits the directory of interest to be recreated. For example, if the user seeks to do a checksum request for a file A in a directory path dir1/dir2/dir3, metadata filter 94 sets up a metaroot for dir1. Metadata filter then accesses the directory lookup and query functions on file system 56 to obtain the path dir2/dir3. A checksum is derived from the block or file of interest and returned to dir3 in the created namespace. The namespace convention is convenient since users are familiar with the directory construct, and need only execute the desired command.

Metadata filter 94 can register with filter framework 92 as either a synchronous or an asynchronous mode filter. Metadata filter 94 includes directory query and lookup filtering, as well as options for metadata information, such as checksum and physical location information. Filter framework 92 may invoke metadata filter 94 based on the request received from client 45, and obtain directory query and lookup information related to the request. Filter framework 92 may then use the directory query and lookup information to invoke checksum or physical location aspects of metadata filter 94. The response from the checksum or physical location portions of metadata filter 94 are specifically tagged for return to client 45. The tags may be used to identify filter responses for use by other filters and requests.

The checksum portion of metadata filter 94 may also respond to the invocation by filter framework 92 with the creation of a file or directory with the same name for each entry in the directory response. The checksum portion of metadata filter 94 may also modify a directory query result to change the metadata information. The response data to client related to metadata checksum information includes a checksum method and the total number of blocks involved in the checksum, as well as a block number and a checksum value for each identified block number. A checksum method is the way in which the checksum is calculated, such as by cyclic redundancy check (CRC) or secure hash algorithm (SHA) or using another algorithm.

The physical location request also causes the formation of a namespace with a metaroot and directory structure mirror 96. Metadata filter 94 does a directory lookup and query to build the directory structure of interest in the namespace, with the metaroot as the top level directory block or identifier. The physical location information may be obtained by reading the physical volume block number of the file or block of interest.

Metadata filter 94 can traverse the physical location name space in file system 56, read the physical file and retrieve the physical locations for each block of the file. The data returned for the request for physical location metadata information includes the total number of blocks, and for each block number a physical logical offset on the associated volume, and the physical location on the disk, with the disk number. When client 45 sends a request for physical locations, and the namespace is created and the physical information is returned, the information is arranged in a file in the metaroot directory structure that mirrors the directory structure that client 45 sees in file system 56. Any of the files formed under the metaroot directory structure can be opened and read by client 45. The files under the specified metaroot have the same name as the original files in the name space of file system 56.

When client 45 provides the metadata request to protocol interface 55, the request is formatted to provide a number of parameters, including a volume ID, a file handle, a read offset or a read amount. Filter framework 92 provides a request callback into metadata filter 94 using the read parameters. Filter framework 92 may also check the requested metaroot against a metaroot referenced by metadata filter 94, and load an appropriate metadata filter if desired for a particularly specified metaroot.

Checksum metadata requests prompt the checksum portion of metadata filter 94 to determine the appropriate file in the physical name space of file system 56. The read request may include a directory query that creates a file stub, which can then provide the inode number of the desired file in file system 56. If the read request includes a directory query that returns a virtual file, such as a file from metaroot mirror 96, the generation ID of the file may be examined to determine if the appropriate name space is being used, and if so whether the inode of the virtual file is the same as the inode provided for the file in file system 56. Once the inode for the file in file system 56 is determined, a block checksum can be determined either by directly calculating the checksum or by making a file system call to obtain a block checksum. Once the checksum value is obtained, the response to the read request provides a data structure format that includes the checksum method, the total number of blocks, and a block number with an associated checksum value for each of the blocks processed by the checksum portion of metadata filter 94.

The physical location portion of metadata filter 94 similarly calls file system 56 to retrieve a file block location and formats a response to the request that includes a data structure having a block number, a physical logical offset on the associated volume, a physical location on the associated disk, and the disk number.

The data provided through the checksum or physical location portions of metadata filter 94 provide responses to a request by client 45 to expose data that is usually hidden or dynamic, such that the data is usually difficult to obtain or calculate. Direct reads to a metaroot applied to metadata filter 94 result in reads being directed to active file system 56. The desired metadata information, whether checksum or physical location, or other, is produced by metadata filter 94 in the form of a file readable by client 45. Metadata filter 94 modifies file attributes in the file to produce a file size that is the size of the requested metadata information.

Another exemplary filter provides an incremental backup operation for a file system. The incremental backup can be transparent, meaning that backup applications can read incremental changes directly from the active file system. Alternately, or in addition, the incremental backup operation can take advantage of a change log filter that tracks all changes to the file system for use with a backup application.

Figure 10:
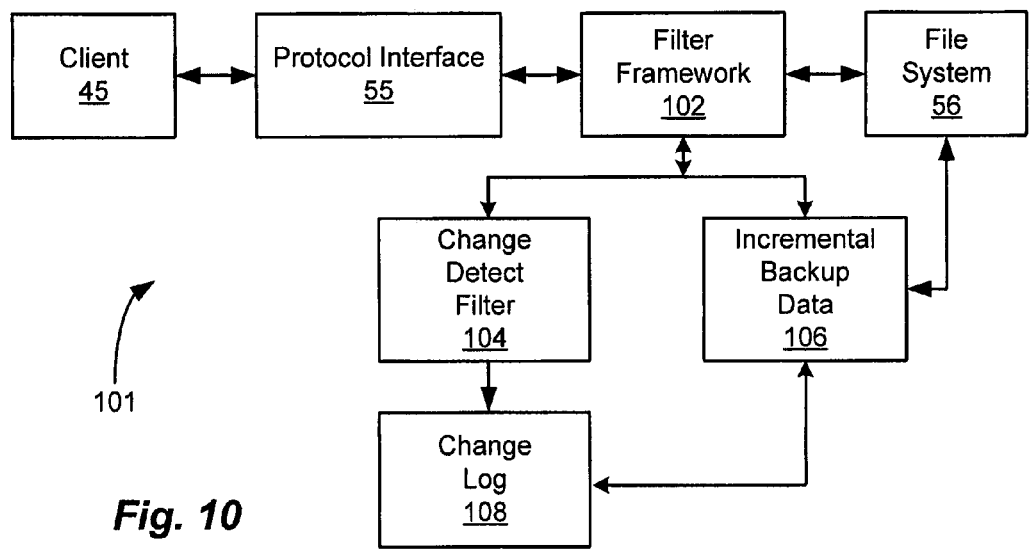
FIG. 10 is a block diagram illustrating a filter for incremental backup operations in accordance with the present invention.

Referring now to FIG. 10, a flow diagram for a filter system 101 illustrates an incremental backup filter that simplifies the operation of backup applications executed for file system 56. In accordance with actions by client 45, changes to blocks in file system 56 occur from time to time. Some of the activities that cause requests related to block changes include write, delete, rename, create, set attribute, set securities and set extended attributes actions or commands. The request is forwarded from client 45 through protocol interface 55 to filter framework 102. Protocol interface 55 converts the request protocol to internal system format requests. Filter framework 102 determines a call model for invoking a desired filter from among the options of synchronous, asynchronous or asynchronous release modes.

Filter system 101 shows two incremental backup filters, a change detect filter 104 and a data provider filter 106. Change detect filter 104 may be called using asynchronous release mode, in which change detect filter 104 does not block the incoming I/O in the request, and does not block the calling thread. Filter framework 102 makes a reference copy of incoming I/O parameters for use by filter 104 in accordance with asynchronous release mode.

Filter 104 captures requests related to data modification, including commands such as write, delete, rename, create, set attribute, set securities and set extended attributes. The captured requests are used to update change log 108 for reference during incremental backup reads. Filter 104 can generate requests for input and output with the file system. For example, the filter may provide a request for checksum data, and output entries for maintaining log information. Client commands captured by the filter in relation to modification to file system data are parsed and used to format log entries that may include information such as a volume ID, a file handle including an inode or file ID, an operation, an offset and a length. Entries are added to a change log in the file system, which may be in the form of a B-tree. A B-tree is a tree data structure that maintains the data in a sorted format while permitting insertions and deletions. Other formats for the change log are equally applicable, including a simple sequential log.

The transparent incremental backup avoids a step of calculating an incremental backup set of parameters for doing an incremental backup. The file system filter intercepts writes to the file system and records which file blocks have "dirty" regions, meaning that changes have been made to those file blocks or directories that have not yet been backed up. The filter also checks with backup applications to identify their read requests. The backup applications typically operate by calculating incremental backup information and then reading and storing a copy of the blocks calculated as needing backup. With filter 104, the block reads result in either a block to copy and store provided to the backup application, or a return code indicating no need to read. The backup application need not determine which incremental backups need to be made, since filter 104 provides that data transparently. Incremental backup data filter 106 can be implemented to operate in asynchronous release mode. Filter 106 uses a change detection to parse requests from client 45 and create entries in change log 108 when appropriate. The parsed request results in information about volume ID, file handle including inode and file ID, operation, offset and length. Backup applications simply access change log 108 to determine the latest blocks for backup.

Referring to FIGS. 9 and 10, metadata filter 94, change detect filter 104 and incremental backup data filter 106 register with filter framework 92 for callback operations, such as callbacks based on requests and responses. In addition, filters 94, 104 and 106 register for I/O priority, which determines where in a cascade of filters registered with filter framework 92 filters 94, 104 and 106 will be called. When filters 94, 104 and 106 register with a higher I/O priority, they are called before other filters that register with a lower I/O priority. As with other filters, filters 94, 104 and 106 receive an I/O tag generated by filter framework 92 so that I/O generated from filters 94, 104 and 106 can be identified. Identification through the use of tags assigned by filter framework 92 helps to avoid conflicts that may occur with filters requesting the same resources, or filters that may cause or exhibit re-entrant behavior.

Depending upon the position of filter framework 92 in the filer, filters 94, 104 and 106 may operate on converted system internal requests and responses, or may operate on requests and responses within higher level protocols, such as external or network protocols. Filter framework 92 also provides management functions for filters 94, 104 and 106, such as loading and unloading, starting and stopping and filter configuration. Filter framework 92 produces callbacks upon implementation of each of the above functions. Filters 94, 104 and 106 implement callbacks as well, such as for file open, file read, file lookup, file write, get attribute and directory read, for examples. The callback model used by filter framework 92 may be the synchronous mode, the asynchronous mode or the asynchronous release mode, as determined by filters 94, 104 and 106 upon registration with filter framework 92.

Filters 94, 104 and 106 also include version information to take advantage of versioning in filter framework 92. For example, filter framework 92 permits filter upgrades that can be implemented on the basis of inconsistent versions of a filter. Filter framework 92 can determine an inconsistent version during an upgrade and cause a previous version filter to be stopped and unloaded, and an updated filter version to be loaded and started.

The request and response callbacks implemented by filters 94, 104 and 106 take advantage of contextual information in the request and response parameters. The request and response parameters may include a file name of a file to be opened, user credentials, external source address information, such as a source IP, a process and process name information, or a time for request or response.

The operations herein described are purely exemplary and imply no particular order. Further, the operations can be used in any sequence when appropriate and can be partially used. With the above embodiments in mind, it should be understood that the invention can employ various computer-implemented operations involving data stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives accessible via network attached storage (NAS), Storage Area Networks (SAN), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion. The computer readable medium can also be distributed using a switching fabric, such as used in compute farms.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A filter system for a data storage system having a storage device being accessible to a client interface, the filter system comprising:
   a filter controller interposed between the client interface and the storage device and operable to receive an incoming request having protocol information from the client interface and provide an outgoing request to the storage device, the filter controller being further operable to receive an incoming response from the storage device and provide an outgoing response having protocol information to the client interface;
   a plurality of filters coupled to the filter controller and being responsive to the incoming request and the outgoing response to modify information related to the incoming request and the outgoing response, under control of the filter controller; and
   the filter controller being operative to select a filter of the plurality of filters based on the protocol information and to pass the protocol information to the filter, whereby the filter is further responsive to the protocol information, and wherein the filter is further selected by evaluating a logical expression created from data in an I/O map and an event map, wherein the I/O map is configured to hold identifiers for the plurality of filters and I/O operations for which the plurality of filters are registered, and wherein the event map is configured to hold the identifiers for the plurality of filters and characteristics of the plurality of filters.

2. The filter system according to claim 1, further comprising a filter loader for loading and unloading filters in a consistent state.

3. The filter system according to claim 2, further comprising an indicator for each filter coupled to the filter controller, the indicator being operable to indicate when a given filter is ready to be unloaded.

4. The filter system according to claim 2, further comprising an I/O buffer coupled to the filter controller for storing I/O operations to permit filter I/O operations to be suspended during filter loading or unloading.

5. The filter system according to claim 1, further comprising a filter registry in the filter controller and being operable to store information about calls to a filter to provide a structured filter call mechanism.

6. The filter system according to claim 5, further comprising filter I/O tags registered with the filter registry for identifying filter I/O with an associated filter.

7. The filter system according to claim 5, further comprising an event map coupled to the filter controller and operable to contribute to determining when a filter is called in accordance with filter characteristics.

8. The filter system according to claim 5, further comprising an I/O map data structure coupled to the filter controller and operable to store indications of I/O events that prompt filter calls.

9. The filter system according to claim 1, wherein the filter controller is operable to invoke the filter in a synchronous mode, an asynchronous mode or an asynchronous release mode.

10. The filter system according to claim 1, wherein the filter is a user mode filter.

11. The filter system according to claim 1, wherein the filter is located in a storage media that is physically separate from the data storage system.

12. The filter system according to claim 1, wherein the filter controller is configurable to be coupled to a plurality of selectable points in a data path between the client interface and the storage device for capturing request or response information related to operation of a filter.

13. The filter system according to claim 1, wherein the filter is a kernel mode filter that is compiled from a single source and is independent of the points at which the filter is coupled to the data path.

14. The filter system according to claim 1, wherein the filter is configured and arranged with the filter controller to permit the filter controller to invoke the filter and continue processing requests from the client interface or responses from the storage device.

15. The filter system according to claim 1, wherein the filter is responsive to requests or responses related to directory, file or block accesses.

16. A method for filtering information in a data storage system having a storage device being accessible to a client interface, the method comprising:
   capturing, by a storage server, a request from the client interface and a response from the storage device;
   providing protocol information from the captured request and response to a plurality of filters;
   selecting a filter of the plurality of filters by evaluating a logical expression created from data in an I/O map and an event map, wherein the I/O map is configured to hold identifiers for the plurality of filters and I/O operations for which the plurality of filters are registered, and wherein the event map is configured to hold the identifiers for the plurality of filters and characteristics of the plurality of filters performing filtering operations with the filter of the plurality of filters selected based on the protocol information and by evaluating the logical expression, in response to the captured request and response to selectively modify information related to the captured request and response; and selectively forwarding the captured request and response to the storage device and client interface, respectively, depending upon a result of the filtering operations.

17. The method according to claim 16, further comprising providing a status indication based on the filtering operations to contribute to determining the selective forwarding of requests or responses.

18. The method according to claim 16, further comprising loading a filter into a memory to permit access to the filter for performing the selective modification of information.

19. The method according to claim 18, further comprising indicating when the filter is ready to be unloaded.

20. The method according to claim 19, further comprising unloading the filter from the memory when the filter is indicated as being ready to be unloaded.

21. The method according to claim 20, further comprising storing I/O operations related to performing filtering operations in an I/O buffer.

22. The method according to claim 21, further comprising suspending I/O operations during filter loading or unloading.

23. The method according to claim 16, further comprising invoking filter request or response handlers based on the captured requests or responses.

24. The method according to claim 16, further comprising registering a filter with a registry data structure to define characteristics of the filtering operations of the filter.

25. The method according to claim 24, further comprising registering an I/O operation with the registry data structure related to the filtering operations.

26. The method according to claim 25, further comprising tagging the registered I/O operation with a tag associated with the filter, the tag contributing to identifying the registered I/O operation with the filter.

27. The method according to claim 25, further comprising determining if the registered filter should be called upon an occurrence of the registered I/O operation, based on the defined characteristics.

28. The method according to claim 16, further comprising performing filtering operations in a synchronous mode, an asynchronous mode or an asynchronous release mode.

29. The method according to claim 16, further comprising performing filtering operations in a user mode.

30. The method according to claim 16, further comprising performing filtering operations in a remote user mode.

31. The method according to claim 16, further comprising providing a plurality of selectable points in a data path between the client interface and the storage device for capturing requests or responses for performing filtering operations.

32. The method according to claim 31, further comprising compiling a filter from a single source such that the filter is independent of the selectable points for capturing requests or responses.

33. The method according to claim 16, further comprising continuing processing of requests from the client interface or responses from the storage device while performing filtering operations.

34. The method according to claim 16, further comprising performing filtering operations responsive to requests or responses related to directory, file or block accesses.

35. A filter system for a data storage system having an input/output (I/O) interface and a storage media, comprising:
  a filter controller interposed between the I/O interface and the storage media for processing requests and responses to and from the I/O interface and the storage media;
  a plurality of filters coupled to the filter controller and being responsive to a request and response to modify information related to the request and response, under control of the filter controller; and
  a filter invocation mechanism for invoking a filter of the plurality of filters under control of the filter controller based on protocol information in the request and response and being operable to permit the filter controller to invoke the filter and continue processing other requests and responses while the filter responds to the request and response, and wherein the filter is further invoked by evaluating a logical expression created from data in an I/O map and an event map, wherein the I/O map is configured to hold identifiers for the plurality of filters and I/O operations for which the plurality of filters are registered, and wherein the event map is configured to hold the identifiers for the plurality of filters and characteristics of the plurality of filters.

36. A filter system for a file storage operating system having an input/output (I/O) interface and a storage media, the filter system comprising:
  a filter controller interposed between the I/O interface and the storage media for processing requests and responses between the I/O interface and the storage media;
  a plurality of filters coupled to the filter controller and being responsive to a request and response to modify information related to the request and response, under control of the filter controller, the filter controller to select a filter of the plurality of filters based on protocol information in the request and response, and wherein the filter is further selected by evaluating a logical expression created from data in an I/O map and an event map, wherein the I/O map is configured to hold identifiers for the plurality of filters and I/O operations for which the plurality of filters are registered, and wherein the event map is configured to hold the identifiers for the plurality of filters and characteristics of the plurality of filters;
  a filter loader for loading and unloading the plurality of filters in the filter system; and
  an I/O buffer coupled to the filter controller for storing I/O operations to permit filter I/O operations to be suspended during filter loading and unloading.

37. A file operating system having a filter system for a storage device being accessible to a client interface, the file operating system comprising:
  filter invocation means for performing a call to a filter of a plurality of filters based on protocol information being transferred between the client interface and the storage device;
  filtering means for filtering the information under control of the filter invocation means to permit or prevent processing of the information transferred between the client interface and the storage device during filtering processing, wherein the filtering means is selected from a plurality of filters by evaluating a logical expression created from data in an I/O map and an event map, wherein the I/O map is configured to hold identifiers for the plurality of filters and I/O operations for which the plurality of filters are registered, and wherein the event map is configured to hold the identifiers for the plurality of filters and characteristics of the plurality of filters; and block processing means responsive to the filtering means for processing blocks of data in the file operating system to filter blocks transferred between the client interface and the storage device.

38. A computer-program product comprising:

a computer-readable medium having computer program code embodied thereon for filtering information in a data storage system having a storage device being accessible to a client interface, the computer program code adapted to:

capture a request from the client interface and a response from the storage device;

provide protocol information from the captured request and response to a plurality of filters;

perform filtering operations with a filter of the plurality of filters selected based on the protocol information, in response to the captured request and response to selectively modify information related to the captured request and response, and wherein the filter is further selected by evaluating a logical expression created from data in an I/O map and an event map, wherein the I/O map is configured to hold identifiers for the plurality of filters and I/O operations for which the plurality of filters are registered, and wherein the event map is configured to hold the identifiers for the plurality of filters and characteristics of the plurality of filters; and selectively forward the captured request and response to the storage device and client interface, respectively, depending upon a result of the filtering operations.

* * * * *